(12) United States Patent
Bernat et al.

(10) Patent No.: US 10,235,229 B1
(45) Date of Patent: Mar. 19, 2019

(54) REHABILITATING STORAGE DEVICES IN A STORAGE ARRAY THAT INCLUDES A PLURALITY OF STORAGE DEVICES

(71) Applicant: Pure Storage, Inc., Mountain View, CA (US)

(72) Inventors: Andrew Bernat, Mountain View, CA (US); James Cihla, San Jose, CA (US); Jungkeun Kim, Palo Alto, CA (US); Iris McLeary, San Francisco, CA (US); Damian Yurzola, San Jose, CA (US)

(73) Assignee: Pure Storage, Inc., Mountain View, CA (US)

( * ) Notice: Subject to any disclaimer, the term of this patent is extended or adjusted under 35 U.S.C. 154(b) by 122 days.

(21) Appl. No.: 15/338,498

(22) Filed: Oct. 31, 2016

Related U.S. Application Data

(60) Provisional application No. 62/384,493, filed on Sep. 7, 2016.

(51) Int. Cl.
  *G06F 11/00* (2006.01)
  *G06F 11/07* (2006.01)
  (Continued)

(52) U.S. Cl.
  CPC ........ *G06F 11/0727* (2013.01); *G06F 3/0619* (2013.01); *G06F 3/0659* (2013.01);
  (Continued)

(58) Field of Classification Search
  CPC ............. G06F 11/0727; G06F 11/0751; G06F 11/0793; G06F 11/3034; G06F 11/3409;
  (Continued)

(56) References Cited

U.S. PATENT DOCUMENTS

| | | | |
|---|---|---|---|
| 5,574,855 A | * | 11/1996 | Rosich ................ G06F 11/2221 714/41 |
| 5,706,210 A | | 1/1998 | Kumano et al. |

(Continued)

FOREIGN PATENT DOCUMENTS

| | | |
|---|---|---|
| EP | 0725324 A2 | 8/1996 |
| WO | WO 2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Joseph D Manoskey
(74) *Attorney, Agent, or Firm* — Edward J. Lenart; Kennedy Lenart Spraggins, LLP

(57) ABSTRACT

Rehabilitating storage devices in a storage array that includes a plurality of storage devices, including: receiving a request to rehabilitate a storage device that is operating outside of a defined range of expected operating parameters; selecting, from a hierarchy of rehabilitative actions that can be performed on the storage device, a rehabilitative action to perform on a storage device in dependence upon information describing a number of times that one or more of the rehabilitative actions have been performed on the storage device; and initiating execution of the selected rehabilitative action.

20 Claims, 10 Drawing Sheets

(51) Int. Cl.
  *G06F 3/06* (2006.01)
  *G06F 11/30* (2006.01)
  *G06F 11/34* (2006.01)
(52) U.S. Cl.
  CPC ........ *G06F 3/0683* (2013.01); *G06F 11/0751* (2013.01); *G06F 11/0793* (2013.01); *G06F 11/3034* (2013.01); *G06F 11/3409* (2013.01)
(58) Field of Classification Search
  CPC ............... G06F 11/079; G06F 11/0796; G06F 11/1438; G06F 11/1441; G06F 11/2257; G06F 3/0619; G06F 3/0659; G06F 3/0683
  See application file for complete search history.

(56) References Cited

U.S. PATENT DOCUMENTS

| | | |
|---|---|---|
| 5,799,200 A | 8/1998 | Brant et al. |
| 5,933,598 A | 8/1999 | Scales et al. |
| 6,012,032 A | 1/2000 | Donovan et al. |
| 6,085,333 A | 7/2000 | DeKoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,707,104 B1 | 4/2014 | Jean |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,124,569 B2 | 9/2015 | Hussain et al. |
| 9,134,922 B2 | 9/2015 | Rajagopal et al. |
| 9,159,458 B2 | 10/2015 | Griffin et al. |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,384,082 B1* | 7/2016 | Lee ..................... G06F 11/3034 |
| 9,444,822 B1 | 9/2016 | Borowiec et al. |
| 9,507,532 B1 | 11/2016 | Colgrove et al. |
| 9,792,056 B1* | 10/2017 | Gao ..................... G06F 3/0689 |
| 9,952,781 B2* | 4/2018 | Orme ..................... G06F 3/0619 |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Vana Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0214447 A1* | 7/2014 | Brooker ................. G06Q 10/10 705/2 |
| 2014/0215590 A1 | 7/2014 | Brand |
| 2014/0229654 A1 | 8/2014 | Goss et al. |
| 2014/0230017 A1 | 8/2014 | Saib |

(56) References Cited

U.S. PATENT DOCUMENTS

| | | | |
|---|---|---|---|
| 2014/0258526 | A1 | 9/2014 | Le Sant et al. |
| 2014/0258783 | A1 | 9/2014 | Fenster |
| 2014/0282983 | A1 | 9/2014 | Ju et al. |
| 2014/0285917 | A1 | 9/2014 | Cudak et al. |
| 2014/0325262 | A1 | 10/2014 | Cooper et al. |
| 2014/0351627 | A1 | 11/2014 | Best et al. |
| 2014/0373104 | A1 | 12/2014 | Gaddam et al. |
| 2014/0373126 | A1 | 12/2014 | Hussain et al. |
| 2015/0026387 | A1 | 1/2015 | Sheredy et al. |
| 2015/0074463 | A1 | 3/2015 | Jacoby et al. |
| 2015/0089569 | A1 | 3/2015 | Sondhi et al. |
| 2015/0095515 | A1 | 4/2015 | Krithivas et al. |
| 2015/0113203 | A1 | 4/2015 | Dancho et al. |
| 2015/0121137 | A1 | 4/2015 | McKnight et al. |
| 2015/0134920 | A1 | 5/2015 | Anderson et al. |
| 2015/0149822 | A1 | 5/2015 | Coronado et al. |
| 2015/0193169 | A1 | 7/2015 | Sundaram et al. |
| 2015/0378888 | A1 | 12/2015 | Zhang et al. |
| 2016/0098323 | A1 | 4/2016 | Mutha et al. |
| 2016/0292025 | A1* | 10/2016 | Gupta .................. G06F 11/076 |
| 2016/0350009 | A1 | 12/2016 | Cerreta et al. |
| 2016/0352720 | A1 | 12/2016 | Hu et al. |
| 2016/0352830 | A1 | 12/2016 | Borowiec et al. |
| 2016/0352834 | A1 | 12/2016 | Borowiec et al. |

FOREIGN PATENT DOCUMENTS

| | | | |
|---|---|---|---|
| WO | WO2013071087 | A1 | 5/2013 |
| WO | WO 2014/110137 | A1 | 7/2014 |
| WO | WO 2016/015008 | A1 | 12/2016 |
| WO | WO 2016/190938 | A1 | 12/2016 |
| WO | WO 2016/195759 | A1 | 12/2016 |
| WO | WO 2016/195958 | A1 | 12/2016 |
| WO | WO 2016/195961 | A1 | 12/2016 |

OTHER PUBLICATIONS

PCMag. "Storage Array Definition". Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia. "What is a disk array". Published Jan. 13, 2012. <http://web.archive.org/web/20120113053358/http://www.techopedia.com/definition/1009/disk-array>, 1 page.

Webopedia. "What is a disk array". Published May 26, 2011. <http://web/archive.org/web/20110526081214/http://www.webopedia.com/TERM/D/disk_array.html>, 2 pages.

Li et al., Access Control for the Services Oriented Architecture, Proceedings of the 2007 ACM Workshop on Secure Web Services (SWS '07), Nov. 2007, pp. 9-17, ACM New York, NY.

The International Search Report and the Written Opinion received from the International Searching Authority (ISA/EPO) for International Application No. PCT/US2016/015006, dated Apr. 29, 2016, 12 pages.

The International Search Report and the Written Opinion received from the International Searching Authority (ISA/EPO) for International Application No. PCT/US2016/015008, dated May 4, 2016, 12 pages.

C. Hota et al., Capability-based Cryptographic Data Access Control in Cloud Computing, Int. J. Advanced Networking and Applications, col. 1, Issue 1, dated Aug. 2011, 10 pages.

The International Search Report and the Written Opinion received from the International Searching Authority (ISA/EPO) for International Application No. PCT/US2016/020410, dated Jul. 8, 2016, 17 pages.

The International Search Report and the Written Opinion received from the International Searching Authority (ISA/EPO) for International Application No. PCT/US2016/032084, dated Jul. 18, 2016, 12 pages.

Faith, "dictzip file format", GitHub.com (online). [Accessed Jul. 28, 2015], 1 page, URL: https://github.com/fidlej/idzip.

Wikipedia, "Convergent Encryption", Wikipedia.org (online), accessed Sep. 8, 2015, 2 pages, URL: en.wikipedia.org/wiki/Convergent_encryption.

Storer et al., "Secure Data Deduplication", Proceedings of the 4th ACM International Workshop on Storage Security and Survivability (StorageSS'08), Oct. 2008, 10 pages, ACM New York, NY. USA. DOI: 10.1145/1456469.1456471.

The International Search Report and the Written Opinion received from the International Searching Authority (ISA/EPO) for International Application No. PCT/US2016/016333, dated Jun. 8, 2016, 12 pages.

ETSI, Network Function Virtualisation (NFV); Resiliency Requirements, ETSI GS NFCV-REL 001, V1.1.1, http://www.etsi.org/deliver/etsi_gs/NFV-REL/001_099/001/01.01.01_60/gs_NFV-REL001v010101p.pdf (online), dated Jan. 2015, 82 pages.

The International Search Report and the Written Opinion received from the International Searching Authority (ISA/EPO) for International Application No. PCT/US2016/032052, dated Aug. 30, 2016, 17 pages.

Microsoft, "Hybrid for SharePoint Server 2013—Security Reference Architecture", <http://hybrid.office.com/img/Security_Reference_Architecture.pdf> (online), dated Oct. 2014, 53 pages.

Microsoft, "Hybrid Identity", <http://aka.ms/HybridIdentityWp> (online), dated Apr. 2014, 36 pages.

Microsoft, "Hybrid Identity Management", <http://download.microsoft.com/download/E/A/E/EAE57CD1-A80B-423C-96BB-142FAAC630139/Hybrid_Identity_Datasheet.pdf> (online), published Apr. 2014, 17 pages.

Jacob Bellamy-McIntyre et al., "OpenID and the Enterprise: A Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.

The International Search Report and the Written Opinion received from the International Searching Authority (ISA/EPO) for International Application No. PCT/US2016/035492, dated Aug. 17, 2016, 10 pages.

Gilbert, "Ubuntu Manpage: sg_sat_set_features", xenial (8) manual, Ubuntu.com (online), [accessed Aug. 29, 2016], 3 pages, URL: manpages.ubuntu.com/manpages/xenial/en/man8/sg_sat_set_features.8.html#contenttoc8.

Gilbert, "Ubuntu Manpage: sg_sat_identify", precise (8) manual, Ubuntu.com (online), [accessed Aug. 29, 2016], 3 pages, URL: manpages.ubuntu.com/manpages/precise/man8/sg_sat_identify.8.html#contenttoc6.

Weber, "Information technology—ATA/ATAPI Command Set—3 (ACS-3)", Working Draft Project, American National Standard, T13/2161-D, Revision 5, Oct. 2013, 577 pages, American National Standards Institute, New York NY.

The International Search Report and the Written Opinion received from the International Searching Authority (ISA/EPO) for International Application No. PCT/US2016/036693, dated Aug. 29, 2016, 10 pages.

The International Search Report and the Written Opinion received from the International Searching Authority (ISA/EP) for International Application No. PCT/US2016/038758, dated Oct. 7, 2016, 10 pages.

The International Search Report and the Written Opinion received from the International Searching Authority (ISA/EP) for International Application No. PCT/US2016/040393, dated Sep. 22, 2016, 10 pages.

The International Search Report and the Written Opinion received from the International Searching Authority (ISA/EP) for International Application No. PCT/US2016/044020, dated Sep. 30, 2016, 11 pages.

Kwok Kong, Using PCI Express As the Primary System Interconnect in Multiroot Compute, Storage, Communications and Embedded Systems, IDT, White Paper, <http://www.idt.com/document/

(56) References Cited

OTHER PUBLICATIONS whp/idt-pcie-multi-root-white-paper>, retrieved by WIPO Dec. 4, 2014, dated Aug. 28, 2008, 12 pages.

The International Search Report and the Written Opinion received from the International Searching Authority (ISA/EP) for International Application No. PCT/US2016/044874, dated Oct. 7, 2016, 11 pages.

The International Search Report and the Written Opinion received from the International Searching Authority (ISA/EP) for International Application No. PCT/US2016/044875, dated Oct. 5, 2016, 13 pages.

The International Search Report and the Written Opinion received from the International Searching Authority (ISA/EP) for International Application No. PCT/US2016/044876, dated Oct. 21, 2016, 12 pages.

The International Search Report and the Written Opinion received from the International Searching Authority (ISA/EP) for International Application No. PCT/US2016/044877, dated Sep. 29, 2016, 13 pages.

Xiao-Yu Hu et al., *Container Marking: Combining Data Placement, Garbage Collection and Wear Levelling for Flash*, 19th Annual IEEE International Symposium on Modelling, Analysis, and Simulation of Computer and Telecommunications Systems, ISBN: 978-0-7695-4430-4, DOI: 10.1109/MASCOTS.2011.50, dated Jul. 25-27, 2011, 11 pages.

\* cited by examiner

REHABILITATING STORAGE DEVICES IN A STORAGE ARRAY THAT INCLUDES A PLURALITY OF STORAGE DEVICES

CROSS-REFERENCE TO RELATED APPLICATION

This application is a non-provisional application for patent entitled to a filing date and claiming the benefit of earlier-filed U.S. Provisional Patent Application Ser. No. 62/384,493, filed on Sep. 7, 2016.

DESCRIPTION OF EMBODIMENTS

Figure 1:
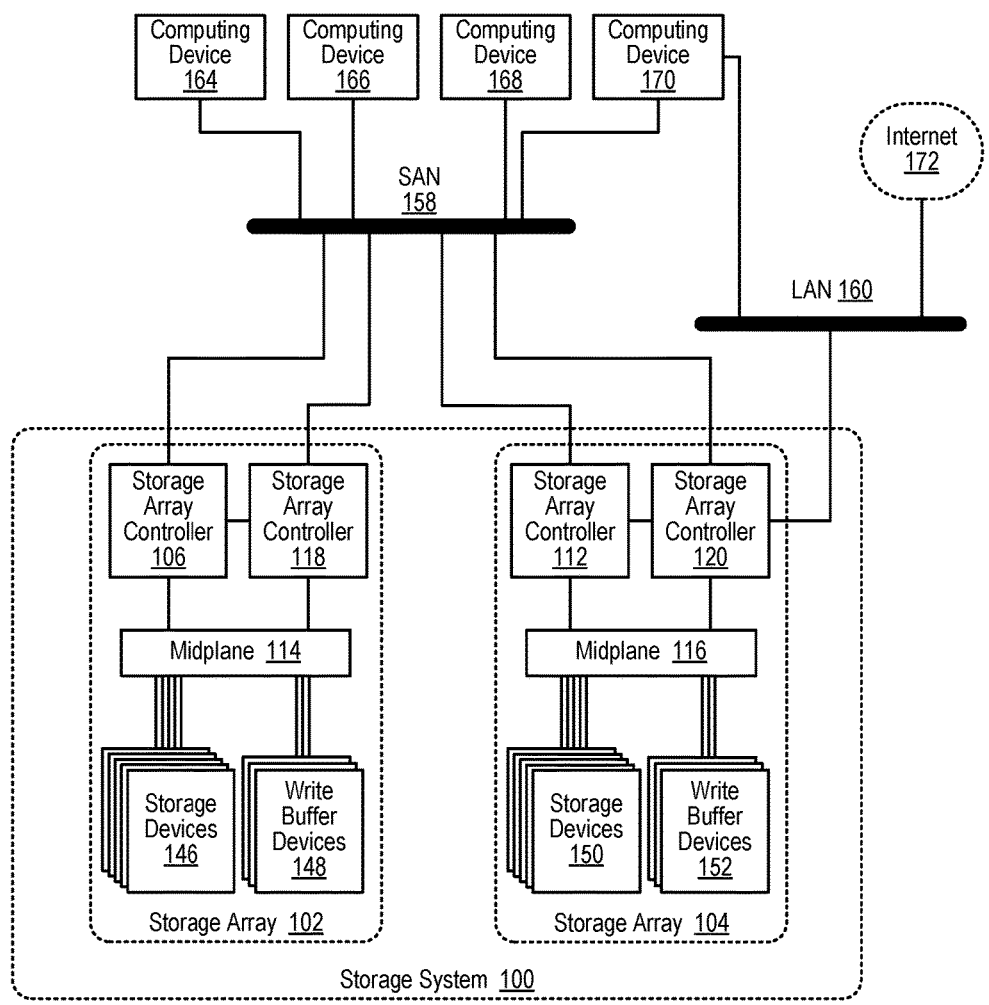
FIG. 1 sets forth a block diagram of a storage system configured for rehabilitating storage devices according to embodiments of the present disclosure.

Example methods, apparatuses, and products for rehabilitating storage devices in a storage array that includes a plurality of storage devices in accordance with the present invention are described with reference to the accompanying drawings, beginning with FIG. 1. FIG. 1 sets forth a block diagram of a storage system (100) configured for rehabilitating storage devices according to embodiments of the present disclosure.

The storage system (100) depicted in FIG. 1 includes a plurality of storage arrays (102, 104), although rehabilitating storage devices in a storage array that includes a plurality of storage devices in accordance with embodiments of the present disclosure may be carried out in storage systems that include only a single storage array. Each storage array (102, 104) may be embodied as a collection of computer hardware devices that provide persistent data storage to users of the storage system (100). Each storage array (102, 104) may include a collection of data storage devices that are mounted within one or more chassis, racks, or other enclosure. Although not expressly depicted in FIG. 1, each storage array (102, 104) may include a plurality of power supplies that deliver power to one or more components within the storage system (100) via a power bus, each storage array (102, 104) may include a plurality of data communications networks that enables one or more components within the storage system (100) to communicates, each storage array (102, 104) may include a plurality of cooling components that are used to cool one or more components within the storage system (100), and so on.

The example storage arrays (102, 104) depicted in FIG. 1 may provide persistent data storage for computing devices (164, 166, 168, 170) that are coupled to the storage system (100) via one or more data communications networks. Each of the computing devices (164, 166, 168, 170) depicted in FIG. 1 may be embodied, for example, as a server, a workstation, a personal computer, a notebook, a smartphone, a tablet computer, or the like. The computing devices (164, 166, 168, 170) in the example of FIG. 1 are coupled for data communications to the storage arrays (102, 104) through a storage area network ('SAN') (158). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers will appreciate that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The computing devices (164, 166, 168, 170) depicted in FIG. 1 are also coupled for data communications to the storage arrays (102, 104) through a local area network (160) ('LAN'). The LAN (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Real Time Protocol ('RTP') and others as will occur to those of skill in the art. The LAN (160) depicted in FIG. 1 may be coupled to other computing devices not illustrated in FIG. 1, for example, via the Internet (172). Although only one storage array (104) is expressly depicted as being coupled to the computing devices (164, 166, 168, 170) via the LAN (160), readers will appreciate that other storage arrays (102) in the storage system (100) may also be coupled to the computing devices (164, 166, 168, 170) via the same LAN (160) or via a different LAN.

Each storage array (102, 104) depicted in FIG. 1 includes a plurality of storage array controllers (106, 112, 118, 120). Each storage array controller (106, 112, 118, 120) may be embodied as a module of automated computing machinery comprising computer hardware, computer software, or a combination of computer hardware and software. Each storage array controller (106, 112, 118, 120) may be configured to carry out various storage-related tasks such as, for example, writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112, 118, 120) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112, 118, 120) may include, for example, a data communications adapter configured to support communications via the SAN (158) and the LAN (160). Although only one of the storage array controllers (120) in the example of FIG. 1 is depicted as being coupled to the LAN (160) for data communications, readers will appreciate that each storage array controller (106, 112, 118, 120) may be independently coupled to the LAN (160). Each storage array controller (106, 112, 118, 120) may also include, for example, an I/O controller or the like that couples the storage array controller (106, 112, 118, 120) for data communications, through a midplane (114, 116), to a number of storage devices (146, 150), and a number of write buffer devices (148, 152) that are utilized as write caches.

In the example depicted in FIG. 1, the presence of multiple storage array controllers (106, 112, 118, 120) in each storage array (102, 104) can enable each storage array (102, 104) to be highly available as there are independent, redundant storage array controllers (106, 112, 118, 120) that are capable of servicing access requests (e.g., reads, writes) to the storage arrays (102, 104). In some embodiments, each storage array controller (106, 112, 118, 120) in a particular storage array (102, 104) may appear to be active to the computing devices (164, 166, 168, 170) as each storage array controller (106, 112, 118, 120) may be available for receiving requests to access the storage array (102, 104) from the computing devices (164, 166, 168, 170) via the SAN (158) or LAN (160). Although storage array controller (106, 112, 118, 120) may be available for receiving requests to access the storage array (102, 104), however, in some embodiments only one storage array controller (106, 112, 118, 120) may actively be allowed to direct access requests to the storage devices (146, 150) or write buffer devices (148, 152). For ease of explanation, a storage array controller that is allowed to direct access requests to the storage devices (146, 150) or write buffer devices (148, 152) may be referred to herein as an 'active' storage array controller whereas a storage array controller that is not allowed to direct access requests to the storage devices (146, 150) or write buffer devices (148, 152) may be referred to herein as a 'passive' storage array controller. Readers will appreciate that because a passive storage array controller may still receive requests to access the storage array (102, 104) from the computing devices (164, 166, 168, 170) via the SAN (158) or LAN (160), the passive storage array controller may be configured to forward any access requests received by the passive storage array controller to the active storage array controller.

Consider an example in which a first storage array controller (106) in a first storage array (102) is the active storage array controller that is allowed to direct access requests to the storage devices (146) or write buffer devices (148) within the first storage array (102), while a second storage array controller (118) in the first storage array (102) is the passive storage array controller that is not allowed to direct access requests to the storage devices (146) or write buffer devices (148) within the first storage array (102). In such an example, the second storage array controller (118) may continue to receive access requests from the computing devices (164, 166, 168, 170) via the SAN (158) or LAN (160). Upon receiving access requests from the computing devices (164, 166, 168, 170), the second storage array controller (118) may be configured to forward such access requests to the first storage array controller (106) via a communications link between the first storage array controller (106) and the second storage array controller (118). Readers will appreciate that such an embodiment may reduce the amount of coordination that must occur between the first storage array controller (106) and the second storage array controller (118) relative to an embodiment where both storage array controllers (106, 118) are allowed to simultaneously modify the contents of the storage devices (146) or write buffer devices (148).

Although the example described above refers to an embodiment where the first storage array controller (106) is the active storage array controller while the second storage array controller (118) is the passive storage array controller, over time such designations may switch back and forth. For example, an expected or unexpected event may occur that results in a situation where the first storage array controller (106) is the passive storage array controller while the second storage array controller (118) is the active storage array controller. An example of an unexpected event that could cause a change in the roles of each storage array controller (106, 118) is the occurrence of a failure or error condition with the first storage array controller (106) that causes the storage array (102) to fail over to the second storage array controller (118). An example of an expected event that could cause a change in the roles of each storage array controller (106, 118) is the expiration of a predetermined period of time, as the first storage array controller (106) may be responsible for interacting with the storage devices (146) and the write buffer devices (148) during a first time period while the second storage array controller (118) may be responsible for interacting with the storage devices (146) and the write buffer devices (148) during a second time period. Readers will appreciate that although the preceding paragraphs describe active and passive storage array controllers with reference to the first storage array (102), the storage array controllers (112, 120) that are part of other storage arrays (104) in the storage system (100) may operate in a similar manner.

Each storage array (102, 104) depicted in FIG. 1 includes one or more write buffer devices (148, 152). Each write buffer device (148, 152) may be configured to receive, from the one of the storage array controller (106, 112, 118, 120), data to be stored in one or more of the storage devices (146, 150). In the example of FIG. 1, writing data to the write buffer device (148, 152) may be carried out more quickly than writing data to the storage device (146, 150). The storage array controllers (106, 112, 118, 120) may therefore be configured to effectively utilize the write buffer devices (148, 152) as a quickly accessible buffer for data destined to be written to one or the storage devices (146, 150). By utilizing the write buffer devices (148, 152) in such a way, the write latency experienced by users of the storage system (100) may be significantly improved relative to storage systems that do not include such write buffer devices (148, 152). The write latency experienced by users of the storage system (100) may be significantly improved relative to storage systems that do not include such write buffer devices (148, 152) because the storage array controllers (106, 112, 118, 120) may send an acknowledgment to the user of the storage system (100) indicating that a write request has been serviced once the data associated with the write request has been written to one or the write buffer devices (148, 152), even if the data associated with the write request has not yet been written to any of the storage devices (146, 150).

The presence of the write buffer devices (148, 152) may also improve the utilization of the storage devices (146, 150) as a storage array controller (106, 112, 118, 120) can accumulate more writes and organize writing to the storage devices (146, 150) for greater efficiency. Greater efficiency can be achieved, for example, as the storage array controller (106, 112, 118, 120) may have more time to perform deeper compression of the data, the storage array controller (106, 112, 118, 120) may be able to organize the data into write blocks that are in better alignment with the underlying physical storage on the storage devices (146, 150), the storage array controller (106, 112, 118, 120) may be able to perform deduplication operations on the data, and so on. Such write buffer devices (148, 152) effectively convert storage arrays of solid-state drives (e.g., "Flash drives") from latency limited devices to throughput limited devices. In such a way, the storage array controller (106, 112, 118, 120) may be given more time to better organize what is written to the storage devices (146, 150), but after doing so, are not then mechanically limited like disk-based arrays are.

Each storage array (102, 104) depicted in FIG. 1 includes one or more storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives, and the like.

The storage array controllers (106, 112) of FIG. 1 may be useful in rehabilitating storage devices in a storage array that includes a plurality of storage devices according to embodiments of the present disclosure. The storage array controllers (106, 112) may assist in rehabilitating storage devices by: receiving a request to rehabilitate a storage device that is operating outside of a defined performance range for one or more operating parameters; selecting, from a hierarchy of rehabilitative actions that can be performed on the storage device, a rehabilitative action to perform on the storage device in dependence upon information describing a number of times that one or more of the rehabilitative actions have been performed on the storage device; initiating execution of the selected rehabilitative action; determining whether the storage device is operating outside of the defined range of expected operating parameters after the selected rehabilitative action has been executed; responsive to determining that the storage device is operating outside of the defined range of expected operating parameters after the selected rehabilitative action has been executed, determining whether a higher level rehabilitative action exists; responsive to determining that the higher level rehabilitative action exists, initiating execution of the higher level rehabilitative action; responsive to determining that the higher level rehabilitative action does not exist, designating the storage device for replacement; profiling input/output ('I/O') performance on the storage device; injecting errors into the storage device; determining whether the storage device can recover from the errors; updating the information describing the number of times that each rehabilitative action has been performed on the storage device; updating, in dependence upon a decay schedule, the information describing the number of times that each rehabilitative action has been performed on the storage device; storing, within a predetermined location on one or more storage devices in the storage array, information describing the number of times that each rehabilitative action has been performed on the storage device; determining whether an error that cannot be corrected by one or more of the lower level rehabilitative actions has occurred; responsive to determining that an error that cannot be corrected by one or more of the lower level rehabilitative actions has occurred, selecting a rehabilitative action that is at a higher level in the hierarchy of rehabilitative actions than the lower level rehabilitative actions; receiving a request to rehabilitate a storage device; initiating execution of a lowest level rehabilitative action that has not been performed a maximum number of times, wherein the lowest level rehabilitative action is part of a hierarchy of rehabilitative actions that can be performed on the storage device; maintaining, in computer memory, information describing the number of times that each rehabilitative action has been performed on the storage device; writing, to one or more storage devices in the storage array, the information describing the number of times that each rehabilitative action has been performed on the storage device; determining whether the storage device operating outside of a defined range of expected operating parameters after the lowest level rehabilitative action has been executed; responsive to determining that the storage device is operating outside of the defined range of expected operating parameters after the lowest level rehabilitative action has been executed, determining whether a higher level rehabilitative action exists; responsive to determining that the higher level rehabilitative action exists, initiating execution of the higher level rehabilitative action; responsive to determining that the higher level rehabilitative action does not exist, designating the storage device for replacement; receiving a request to rehabilitate a component in the storage array; selecting, from a hierarchy of rehabilitative actions that can be performed on the component, a rehabilitative action to perform in dependence upon a number of times that each rehabilitative action has been performed on the component; initiating execution of the selected rehabilitative action; and performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Rehabilitating storage devices in a storage array that includes a plurality of storage devices in accordance with embodiments of the present disclosure is generally implemented with computers. In the system of FIG. 1, for example, all the computing devices (164, 166, 168, 170) and storage controllers (106, 112, 118, 120) may be implemented to some extent at least as computers. For further explanation, therefore, FIG. 2 sets forth a block diagram of a storage array controller (202) useful in rehabilitating storage devices in a storage array that includes a plurality of storage devices according to embodiments of the present disclosure.

Figure 2:
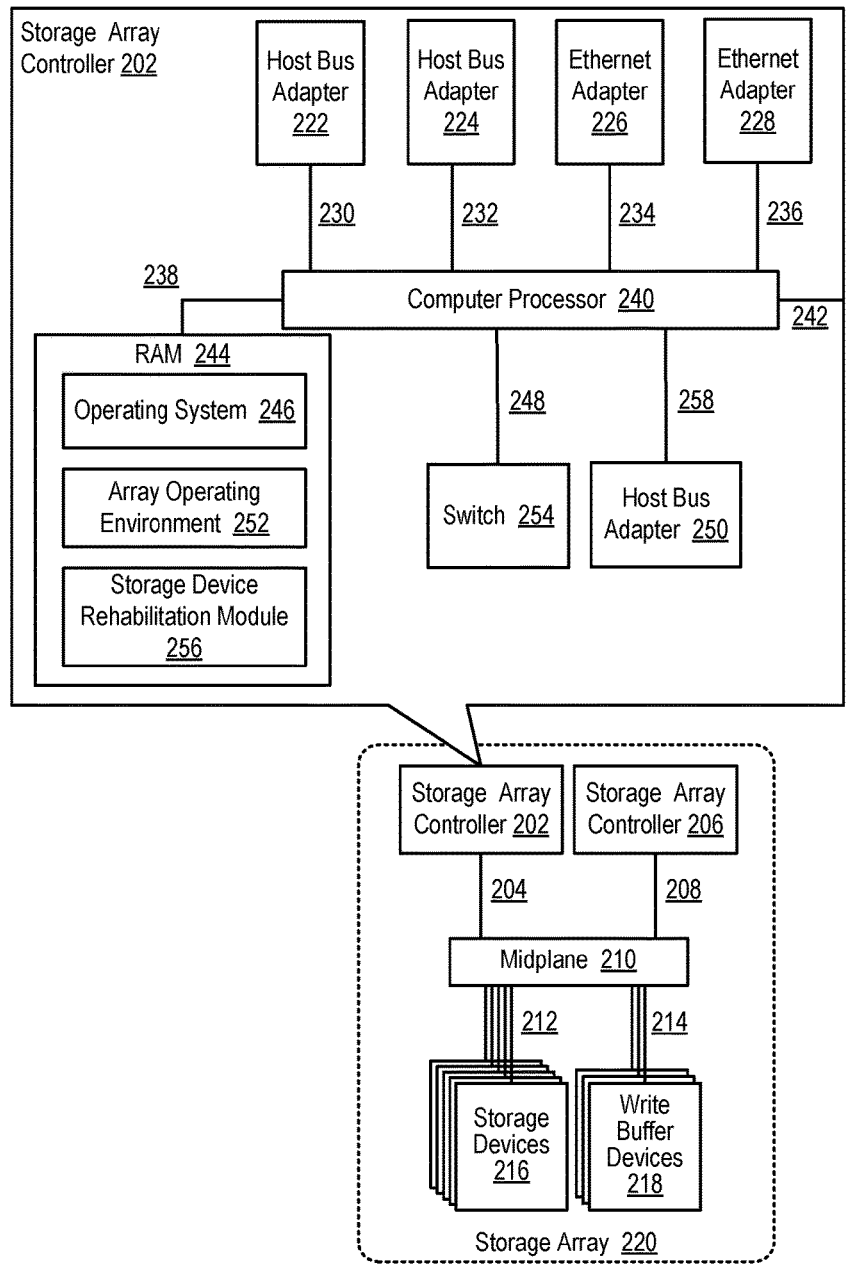
FIG. 2 sets forth a block diagram of a storage array controller useful in rehabilitating storage devices in a storage array that includes a plurality of storage devices according to embodiments of the present disclosure.

The storage array controllers (202, 206) depicted in FIG. 2 may be similar to the storage array controllers depicted in FIG. 1, as the storage array controllers (202, 206) of FIG. 2 may be communicatively coupled, via a midplane (210), to one or more storage devices (216) and to one or more write buffer devices (218) that are included as part of a storage array (220). The storage array controllers (202, 206) may be coupled to the midplane (210) via one or more data communications links (204, 208) and the midplane (206) may be coupled to the storage devices (216) and the memory buffer devices (218) via one or more data communications links (212, 214). The data communications links (204, 208, 212, 214) of FIG. 2 may be embodied, for example, as a Peripheral Component Interconnect Express ('PCIe') bus, as a Serial Attached SCSI (SAS') data communications link, and so on. Although only one of the storage array controllers (202) is depicted in detail, readers will appreciate that other storage array controllers (206) may include similar components. For ease of explanation, however, the detailed view of one of the storage array controllers (202) will be described below.

The storage array controller (202) detailed in FIG. 2 can include at least one computer processor (240) or 'CPU' as well as random access memory ('RAM') (244). The computer processor (240) may be connected to the RAM (244) via a data communications link (238), which may be embodied as a high speed memory bus such as a Double-Data Rate 4 ('DDR4') bus. Although the storage array controller (202) detailed in FIG. 2 includes only a single computer processor, however, readers will appreciate that storage array controllers useful in rehabilitating storage devices in a storage array that includes a plurality of storage devices according to embodiments of the present disclosure may include additional computer processors. Likewise, although the storage array controller (202) detailed in FIG. 2 includes only a RAM (244), readers will appreciate that storage array controllers useful in rehabilitating storage devices in a storage array that includes a plurality of storage devices according to embodiments of the present disclosure may include additional forms of computer memory such as flash memory.

The storage array controller (202) detailed in FIG. 2 includes an operating system (246) that is stored in RAM (246). Examples of operating systems useful in storage array controllers (202, 206) configured for rehabilitating storage devices in a storage array that includes a plurality of storage devices according to embodiments of the present disclosure include UNIX™, Linux™, Microsoft Windows™, and others as will occur to those of skill in the art. The operating system (246) depicted in FIG. 2 may be embodied, for example, as system software that manages computer hardware and software resources on the storage array controller (202).

The storage array controller (202) detailed in FIG. 2 also includes an array operating environment (252) that is stored in RAM (252). The array operating environment (252) may be embodied as one or more modules of computer program instructions used to enable the storage array controller (202) to service access requests that are directed to the storage array (220). The array operating environment (252) may be responsible for generating I/O requests (e.g., read requests, write requests) that are sent to the storage devices (216) or the write buffer devices (218). The array operating environment (252) may be further configured to perform various functions that result in more efficient utilization of the resources within the storage array (220). The array operating environment (252) may be configured, for example, to compress data prior to writing the data to one of the storage devices (216), to perform data deduplication operations, to pool data that is to be written to one of the storage devices (216) so that data may be written in blocks of a predetermined size, and so on.

The storage array controller (202) detailed in FIG. 2 also includes a storage device rehabilitation module (256), a module that includes computer program instructions useful in rehabilitating storage devices in a storage array that includes a plurality of storage devices according to embodiments of the present disclosure. The storage device rehabilitation module (256) may assist in rehabilitating storage devices by: receiving a request to rehabilitate a storage device that is operating outside of a defined performance range for one or more operating parameters; selecting, from a hierarchy of rehabilitative actions that can be performed on the storage device, a rehabilitative action to perform on the storage device in dependence upon information describing a number of times that one or more of the rehabilitative actions have been performed on the storage device; initiating execution of the selected rehabilitative action; determining whether the storage device is operating outside of the defined range of expected operating parameters after the selected rehabilitative action has been executed; responsive to determining that the storage device is operating outside of the defined range of expected operating parameters after the selected rehabilitative action has been executed, determining whether a higher level rehabilitative action exists; responsive to determining that the higher level rehabilitative action exists, initiating execution of the higher level rehabilitative action; responsive to determining that the higher level rehabilitative action does not exist, designating the storage device for replacement; profiling I/O performance on the storage device; injecting errors into the storage device; determining whether the storage device can recover from the errors; updating the information describing the number of times that each rehabilitative action has been performed on the storage device; updating, in dependence upon a decay schedule, the information describing the number of times that each rehabilitative action has been performed on the storage device; storing, within a predetermined location on one or more storage devices in the storage array, information describing the number of times that each rehabilitative action has been performed on the storage device; determining whether an error that cannot be corrected by one or more of the lower level rehabilitative actions has occurred; responsive to determining that an error that cannot be corrected by one or more of the lower level rehabilitative actions has occurred, selecting a rehabilitative action that is at a higher level in the hierarchy of rehabilitative actions than the lower level rehabilitative actions; receiving a request to rehabilitate a storage device; initiating execution of a lowest level rehabilitative action that has not been performed a maximum number of times, wherein the lowest level rehabilitative action is part of a hierarchy of rehabilitative actions that can be performed on the storage device; maintaining, in computer memory, information describing the number of times that each rehabilitative action has been performed on the storage device; writing, to one or more storage devices in the storage array, the information describing the number of times that each rehabilitative action has been performed on the storage device; determining whether the storage device operating outside of a defined range of expected operating parameters after the lowest level rehabilitative action has been executed; responsive to determining that the storage device is operating outside of the defined range of expected operating parameters after the lowest level rehabilitative action has been executed, determining whether a higher level rehabilitative action exists; responsive to determining that the higher level rehabilitative action exists, initiating execution of the higher level rehabilitative action; responsive to determining that the higher level rehabilitative action does not exist, designating the storage device for replacement; receiving a request to rehabilitate a component in the storage array; selecting, from a hierarchy of rehabilitative actions that can be performed on the component, a rehabilitative action to perform in dependence upon a number of times that each rehabilitative action has been performed on the component; initiating execution of the selected rehabilitative action; and performing other functions as will be described in greater detail below.

The storage array controller (202) detailed in FIG. 2 also includes a plurality of host bus adapters (222, 224, 250) that are coupled to the computer processor (240) via a data communications link (230, 232, 258). Each host bus adapter (222, 224, 250) may be embodied as a module of computer hardware that connects the host system (i.e., the storage array controller) to other network and storage devices. Each of the host bus adapters (222, 224, 250) of FIG. 2 may be embodied, for example, as a Fibre Channel adapter that enables the storage array controller (202) to connect to a SAN, as a Target Channel Adapter, as a SCSI/Storage Target Adapter, and so on. The storage array controller (202) depicted in FIG. 2 also includes a plurality of Ethernet adapters (226, 228) that enables the storage array controller (202) to connect to a LAN or other data communications network. Each of the host bus adapters (222, 224, 250) and the Ethernet adapters (226, 228) may be coupled to the computer processor (240) via a data communications link (230, 232, 234, 236, 258) such as, for example, a PCIe bus.

The storage array controller (202) detailed in FIG. 2 also includes a switch (254) that is coupled to the computer processor (240) via a data communications link (248). The switch (254) of FIG. 2 may be embodied as a computer hardware device that can create multiple endpoints out of a single endpoint, thereby enabling multiple devices to share what was initially a single endpoint. The switch (254) of FIG. 2 may be embodied, for example, as a PCIe switch that is coupled to a PCIe bus and presents multiple PCIe connection points to the midplane (210).

The storage array controller (202) of FIG. 2 may also include a data communications link (242) for coupling the storage array controller (202) to other storage array controllers (206). Such a data communications link (242) may be embodied, for example, as a QuickPath Interconnect ('QPI') interconnect, as PCIe non-transparent bridge ('NTB') interconnect, and so on. Readers will recognize that these components, protocols, adapters, and architectures are for illustration only, not limitation. Such a storage array controller may be implemented in a variety of different ways, each of which is well within the scope of the present disclosure.

Figure 3:
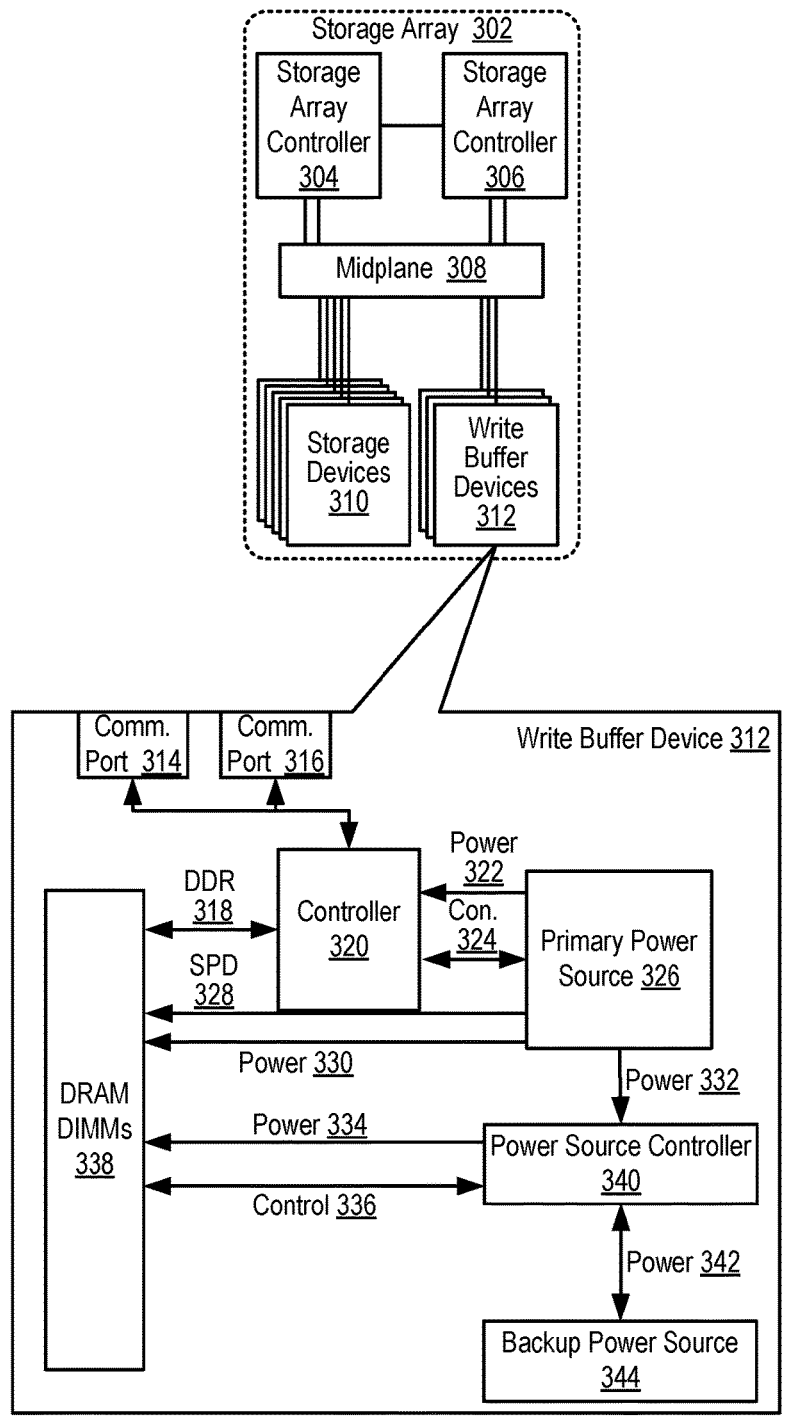
FIG. 3 sets forth a block diagram illustrating a write buffer device useful in storage arrays where storage devices may be rehabilitated according to embodiments of the present invention.

For further explanation, FIG. 3 sets forth a block diagram illustrating a write buffer device (312) useful in storage arrays where storage devices may be rehabilitated according to embodiments of the present invention. The write buffer device (312) depicted in FIG. 3 is similar to the write buffer devices depicted in FIG. 1 and FIG. 2. The write buffer device (312) may be included in a storage array (302) that includes a plurality of storage array controllers (304, 306) that are communicatively coupled to a plurality of storage devices (310) and also communicatively coupled to a plurality of write buffer devices (312) via a midplane (308).

The write buffer device (312) depicted in FIG. 3 includes two data communications ports (314, 316). The data communications ports (314, 316) of FIG. 3 may be embodied, for example, as computer hardware for communicatively coupling the write buffer device (312) to a storage array controller (304, 306) via the midplane (308). For example, the write buffer device (312) may be communicatively coupled to the first storage array controller (304) via a first data communications port (314) and the write buffer device (312) may also be communicatively coupled to the second storage array controller (306) via a second data communications port (316). Although the write buffer device (312) depicted in FIG. 3 includes two data communications ports (314, 316), readers will appreciate that write buffer devices useful for buffering data to be written to an array of non-volatile storage devices may include only one data communications port or, alternatively, additional data communications ports not depicted in FIG. 3.

The write buffer device (312) depicted in FIG. 3 also includes a controller (320). The controller (320) depicted in FIG. 3 may be embodied, for example, as computer hardware for receiving memory access requests (e.g., a request to write data to memory in the write buffer device) via the data communications ports (314, 316) and servicing such memory access requests. The controller (320) depicted in FIG. 3 may be embodied, for example, as an ASIC, as a microcontroller, and so on. The controller (320) depicted in FIG. 3 may be communicatively coupled the data communications ports (314, 316), for example, via a PCIe data communications bus.

The write buffer device (312) depicted in FIG. 3 also includes a plurality of DRAM memory modules, embodied in FIG. 3 as DRAM dual in-line memory modules ('DIMMs') (338). The DRAM DIMMs (338) depicted in FIG. 3 may be coupled to the controller (320) via a memory bus such as a DDR (318) memory bus such that the controller (320) can be configured to write data to the DRAM DIMMs (338) via the DDR (318) memory bus.

The write buffer device (312) depicted in FIG. 3 also includes a primary power source (326). The primary power source (326) may be embodied as computer hardware for providing electrical power to the computing components that are within the write buffer device (312). The primary power source (326) may be embodied, for example, as a switched-mode power supply that supplies electric energy to an electrical load by converting alternating current ('AC') power from a mains supply to a direct current ('DC') power, as a DC-to-DC converter that converts a source of direct current (DC) from one voltage level to another, and so on. The primary power source (326) of FIG. 3 is coupled to the controller (320) via a power line (322) that the primary power source (326) can use to deliver power to the controller (320). The primary power source (326) of FIG. 3 is also coupled to the DRAM DIMMs (338) via a power line (330) that the primary power source (326) can use to deliver power to the DRAM DIMMs (338). The primary power source (326) of FIG. 3 is also coupled to a power source controller (340) via a power line (332) that the primary power source (326) can use to deliver power to the power source controller (340). The primary power source (326) can monitor which components are receiving power through the use of one or more control lines (324), serial presence detect ('SPD') lines (328), or other mechanism for detecting the presence of a device and detecting that power is being provided to the device. Readers will appreciate that write devices useful for buffering data to be written to an array of non-volatile storage devices may include additional computing components not depicted in FIG. 3, each of which may also receive power from the primary power source (326).

The write buffer device (312) depicted in FIG. 3 also includes a backup power source (344). The backup power source (344) depicted in FIG. 3 represents a power source capable of providing power to the DRAM DIMMs (338) in the event that the primary power source (326) fails. In such a way, the DRAM DIMMs (338) may effectively serve as non-volatile memory, as a failure of the primary power source (326) will not cause the contents of the DRAM DIMMs (338) to be lost because the DRAM DIMMs (338) will continue to receive power from the backup power source (344). Such a backup power source (344) may be embodied, for example, as a supercapacitor.

The write buffer device (312) depicted in FIG. 3 also includes a power source controller (340). The power source controller (340) depicted in FIG. 3 may be embodied as a module of computer hardware configured to identify a failure of the primary power source (326) and to cause power to be delivered to the DRAM DIMMs (338) from the backup power source (344). In such an example, power may be delivered to the DRAM DIMMs (338) from the backup power source (344) via a first power line (342) between the power source controller (340) and the backup power source (344), as well as a second power line (334) between the backup power source controller (340) and the DRAM DIMMs (338). The backup power source controller (340) depicted in FIG. 3 may be embodied, for example, as an analog circuit, an ASIC, a microcontroller, and so on. The power source controller (340) can monitor whether the DRAM DIMMs (338) have power through the use of one or more control lines (336) that may be coupled to the DRAM DIMMs (338), as well as one or more control lines that may be coupled to the primary power source (326). In such an example, by exchanging signals between the DRAM DIMMs (338), the primary power source (326), and the power source controller (340), the power source controller (340) may identify whether power is being provided to the DRAM DIMMs (338) by the primary power source (326).

In the example depicted in FIG. 3, the controller (320) may be configured to receive, from a storage array controller (304, 306) via the one or more data communications ports (314, 316), an instruction to write data to the one or more DRAM DIMMs (338). Such an instruction may include, for example, the location at which to write the data, the data to be written to the DRAM DIMMs (338), the identity of the host that issued the instruction, the identity of a user associated with the instruction, or any other information needed to service the instruction. In the example depicted in FIG. 3, the NVRAM controller (320) may be further configured to write the data to the one or more DRAM DIMMs (338) in response to receiving such an instruction.

In the example depicted in FIG. 3, the controller (320) may be further configured to send an acknowledgment indicating that the data has been written to the array (302) of non-volatile storage devices in response to writing the data to the one or more DRAM DIMMs (338). The controller (320) may send the acknowledgment indicating that the data has been written to the array (302) of non-volatile storage devices in response to writing the data to the DRAM DIMMs (338) in the write buffer device (312). Readers will appreciate that although some forms of DRAM DIMMs (338) are considered to be volatile memory, because the DRAM DIMMs (338) are backed by redundant power sources (326, 344), writing the data to the DRAM DIMMs (338) in the write buffer device (312) may be treated the same as writing the data to traditional forms of non-volatile memory such as the storage devices (310). Furthermore, the DRAM DIMMs (338) in the write buffer device (312) can include one or more NVDIMMs. As such, once the data has been written to the DRAM DIMMs (338) in the write buffer device (312), an acknowledgement may be sent indicating that the data has been safely and persistently written to the array (302) of non-volatile storage devices.

In the example depicted in FIG. 3, the controller (320) may be further configured to determine whether the primary power source (326) has failed. The controller (320) may determine whether the primary power source (326) has failed, for example, by receiving a signal over the control line (324) indicating that the primary power source (326) has failed or is failing, by detecting a lack of power from the primary power source (326), and so on. In such an example, the controller (320) may be coupled to the backup power source (344) or may have access to another source of power such that the controller (320) can remain operational if the primary power source (326) does fail.

In the example depicted in FIG. 3, the controller (320) may be further configured to initiate a transfer of data contained in the one or more DRAM DIMMs (338) to flash memory in the write buffer device (312) in response to determining that the primary power source (326) has failed. The controller (320) may initiate a transfer of data contained in the one or more DRAM DIMMs (338) to flash memory in the write buffer device (312), for example, by signaling an NVDIMM to write the data contained in the one or more DRAM DIMMs (338) to flash memory on the NVDIMM.

Although the preceding paragraphs describe storage systems and many of the hardware components and software components contained therein, readers will appreciate that rehabilitating storage devices in a storage array that includes a plurality of storage devices may be carried out in other types of storage systems that include different hardware components and different software components. For example, rehabilitating storage devices in a storage array that includes a plurality of storage devices may be carried out in a storage system that includes a plurality of blades, where each blade can include processing resources such as one or more computer processors, storage resources such as one or more storage devices, or any combination thereof.

Figure 4:
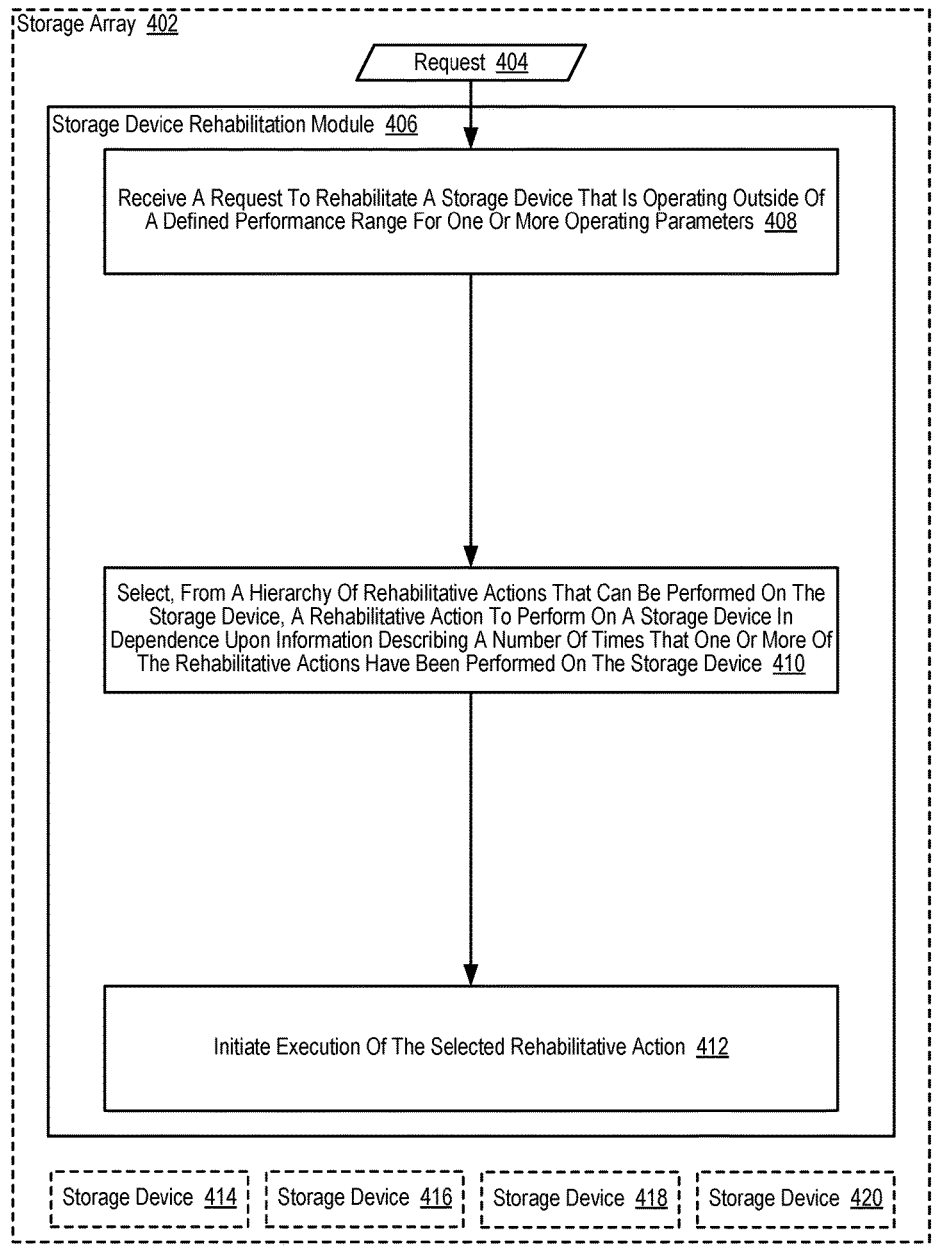
FIG. 4 sets forth a flow chart illustrating an example method for rehabilitating storage devices in a storage array that includes a plurality of storage devices according to embodiments of the present disclosure.

For further explanation, FIG. 4 sets forth a flow chart illustrating an example method for rehabilitating storage devices (414, 416, 418, 420) in a storage array (402) that includes a plurality of storage devices (414, 416, 418, 420) according to embodiments of the present disclosure. Although depicted in less detail, the storage array (402) depicted in FIG. 4 may be similar to the storage arrays described above as the storage array (402) may include storage devices such as SSDs and NVRAM devices, as well as storage array controllers and other components described above.

The example method depicted in FIG. 4 may be carried out, for example, by a storage device rehabilitation module (406). The storage device rehabilitation module (406) may be embodied, for example, as one or more modules of computer program instructions that are executing on computer hardware such as a computer processor. The storage device rehabilitation module (406) may be embodied as one or more standalone modules, as one or more modules within a larger application such as the array operating environment described above with reference to FIG. 2, or in other ways. Although not expressly illustrated in the example depicted in FIG. 4, the storage device rehabilitation module (406) may be executing, for example, on computer hardware that is contained in a storage array controller as described above with reference to FIGS. 1-3, on computer hardware that is contained in one or more blades that are part of a storage system that includes a plurality of blades, and so on.

The example method depicted in FIG. 4 can include receiving (408) a request (404) to rehabilitate a storage device that is operating outside of a defined performance range for one or more operating parameters. The one or more operating parameter may include, for example, read latency, write latency, input/output operations per second ('OPS'), power consumption rate, error rates for one or more errors, throughput, average response time, or any other quantifiable metric that can be used to describe the performance of a storage device. Each operating parameter may be associated with a defined performance range that is used to determine whether a storage device is behaving in an acceptable manner. For example, a storage device may be expected to exhibit a sequential read speed of between 400 MB/s and 500 MB/s. In such an example, the defined performance range for a sequential read speed operating parameter would be 400 MB/s to 500 MB/s.

Readers will appreciate that the defined performance range for each operating parameter may be based on information provided by the manufacturer of the storage device, based on values gathered during testing of the storage device, or in other ways. Readers will further appreciate that in some embodiments the defined performance range for a particular operating parameter may be specified as a minimum value with no specified maximum value. For example, the performance range for an IOPS operating parameter may have a minimum value of 30,000 IOPS with no specified maximum value. Likewise, in some embodiments the defined performance range for a particular operating parameter may be specified as a maximum value with no specified minimum value. For example, the performance range for a response time operating parameter may have a maximum value of 30 nanoseconds with no specified minimum value.

In the example method depicted in FIG. 4, receiving (408) a request (404) to rehabilitate a storage device that is operating outside of a defined performance range for one or more operating parameters may be carried out, for example, by the storage device rehabilitation module (406) receiving a message from one or more other modules in the storage array (402) that tracks the performance of the storage devices (414, 416, 418, 420) in the storage array (402). The request (404) that is received by the storage device rehabilitation module (406) may include information such as an identifier of the particular storage device that is operating outside of a defined performance range for one or more operating parameters, information identifying the particular operating parameters for which the storage device is operating outside of the defined performance range, information identifying a particular error encountered by the storage device, and so on.

The example method depicted in FIG. 4 can also include selecting (410), from a hierarchy of rehabilitative actions that can be performed on the storage device, a rehabilitative action to perform on the storage device. Each rehabilitative action may be embodied as some action that is intended to improve the performance of a storage device that is operating outside of a defined performance range for one or more operating parameters. Examples of such rehabilitative actions may include, for example, temporarily preventing the storage device from servicing I/O operations directed to the storage array (402) and running a performance diagnostics suite on the storage device, power cycling the storage device, executing a secure erase of the storage device, and so on. The rehabilitative actions may be organized into a hierarchy of rehabilitative actions as executing one rehabilitative action may be determined to be more disruptive to the normal operation of the storage array (402) than executing another rehabilitative action. Using the example rehabilitative actions described above, temporarily preventing the storage device from servicing I/O operations directed to the storage array (402) and running a performance diagnostics suite on the storage device may be the lowest level (i.e., least disruptive) rehabilitative action in the hierarchy while executing a secure erase of the storage device may be the highest level (i.e., most disruptive) rehabilitative action in the hierarchy.

Readers will appreciate that limitations may be placed on the number of times that a particular rehabilitative action should be performed on a particular storage device. Limitations may be placed on the number of times that a particular rehabilitative action should be performed on a particular storage device, for example, because repeatedly performing a particular rehabilitative action over and over again can be taken as an indication that the rehabilitative action is not correcting the behavior of a particular storage device. When a particular rehabilitative action is not correcting the behavior of a storage device, it may be desirable to execute a higher level rehabilitative action in the hierarchy in an attempt to correct the behavior of a particular storage device. As such, the rehabilitative action to perform on the storage device may be selected (410) in dependence upon information describing a number of times that one or more of the rehabilitative actions have been performed on the storage device. The information describing the number of times that one or more of the rehabilitative actions have been performed on the storage device may be stored, for example, within memory contained in a storage array controller that is executing the storage device rehabilitation module (406), within one or more of the storage devices (414,416,418,420) in the storage array (402), and so on. The rehabilitative action to perform on the storage device may be selected (410) in dependence upon information describing the number of times that one or more of the rehabilitative actions have been performed on the storage device, for example, by comparing the information describing the number of times that one or more of the rehabilitative actions have been performed on the storage device to a predetermined threshold associated with each of the rehabilitative actions that specifies the maximum number of times that a particular rehabilitative action can be performed on a particular storage device. In such an example, the lowest level rehabilitative action in the hierarchy that has not been performed a maximum number of times may be selected (410) as the rehabilitative action to perform.

Consider an example in which a request (404) to rehabilitate a first storage device (414) in the storage array (402) is received (408). In such an example, assume that the following table is maintained within memory contained in a storage array controller that is executing the storage device rehabilitation module (406):

TABLE 1

Rehabilitative Action Table

| Device ID | Action ID | Times Performed | Maximum |
|---|---|---|---|
| 414 | 1 | 125 | 125 |
| 414 | 2 | 15 | 20 |

TABLE 1-continued

Rehabilitative Action Table

| Device ID | Action ID | Times Performed | Maximum |
|---|---|---|---|
| 414 | 3 | 4 | 5 |
| 416 | 1 | 0 | 125 |
| 416 | 2 | 0 | 20 |
| 416 | 3 | 0 | 5 |
| 418 | 1 | 3 | 125 |
| 418 | 2 | 1 | 20 |
| 418 | 3 | 0 | 5 |
| 420 | 1 | 0 | 100 |
| 420 | 2 | 0 | 15 |
| 420 | 3 | 0 | 3 |

In Table 1, information is maintained identifying the number of times each of three rehabilitative actions have been performed. In such an example, assume that a rehabilitative action associated with an identifier of 1 is the lowest level rehabilitative action in a hierarchy, a rehabilitative action associated with an identifier of 2 is the second highest level rehabilitative action in the hierarchy, and a rehabilitative action associated with an identifier of 3 is the highest level rehabilitative action in the hierarchy. In an example where a request (404) to rehabilitate a first storage device (414) in the storage array (402) is received (408), because the lowest level rehabilitative action has already been performed on the first storage device (414) the maximum number of times that the rehabilitative action can be performed on the first storage device (414), the rehabilitative action associated with an identifier of 2 may be selected (410) as the rehabilitative action to perform on the first storage device (414). Readers will appreciate that although the information identifying the number of times that a particular rehabilitative action has been performed on a particular storage device is illustrated above as being contained in a table, such information may be stored in a variety of other formats.

The example method depicted in FIG. 4 can also include initiating (412) execution of the selected rehabilitative action. Readers will appreciate that in some instances a particular rehabilitative action may be performed by an entity such as a storage array controller that is executing the storage device rehabilitation module (406), while in other instances other components within the storage array (402) may be executing a rehabilitative action. For example, if the rehabilitative action is to power cycle a storage device, such a rehabilitative action may ultimately be performed by a power supply, the storage device itself, another component in the storage array (402), or any combination thereof. Initiating (412) execution of the selected rehabilitative action may therefore be carried out, for example, by the storage device rehabilitation module (406) issuing a command to another component in the storage array (402) to perform the selected rehabilitative action. In embodiments where the storage device rehabilitation module (406) can perform the selected rehabilitative action, initiating (412) execution of the selected rehabilitative action may be carried out by the storage device rehabilitation module (406) invoking the computer program instructions that carry out the selected rehabilitative action. Readers will appreciate that in other embodiments, initiating (412) execution of the selected rehabilitative action may be carried out by both the storage device rehabilitation module (406) and other components in the storage array (402) performing various tasks.

Figure 5:
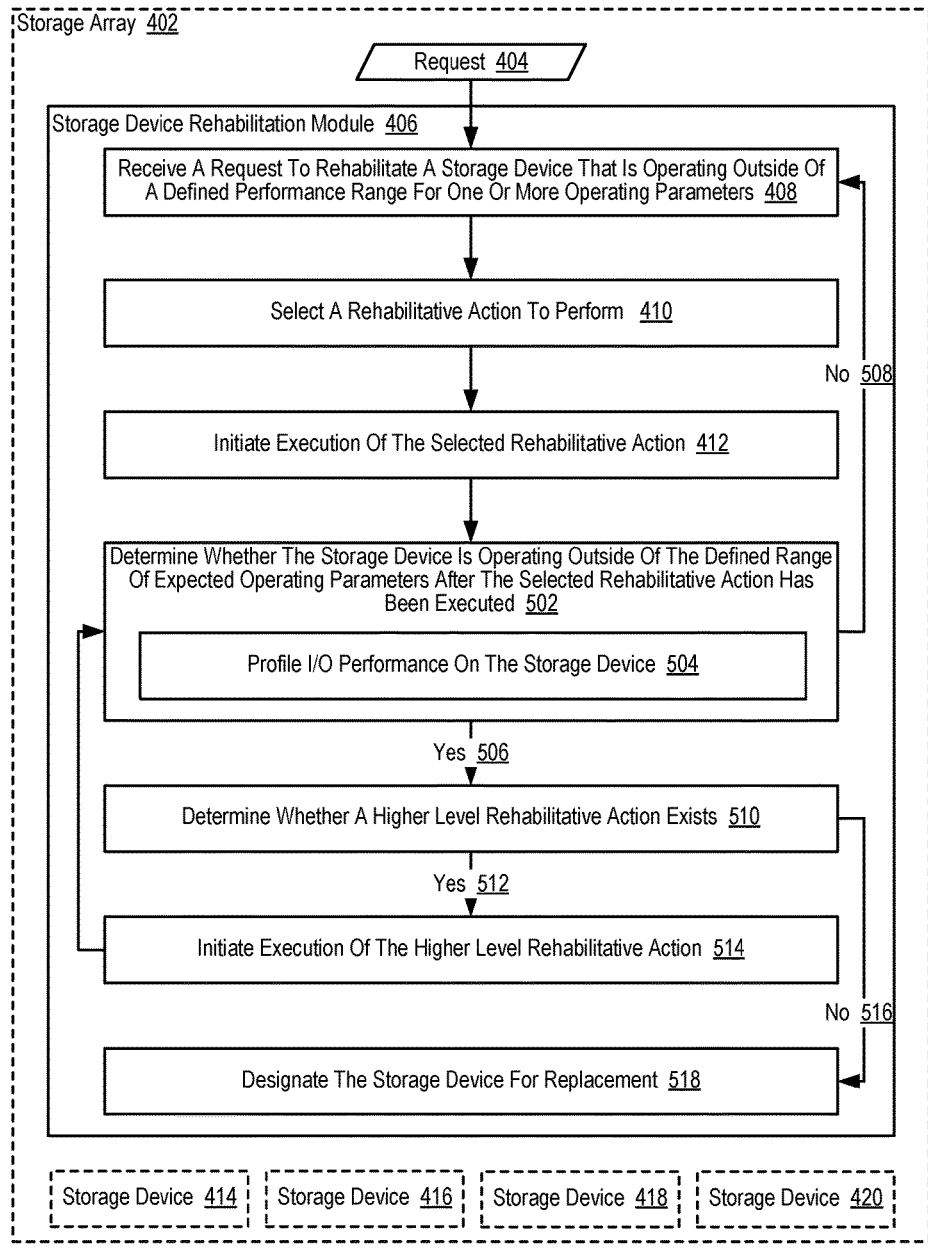
FIG. 5 sets forth a flow chart illustrating an additional example method for rehabilitating storage devices in a storage array that includes a plurality of storage devices according to embodiments of the present disclosure.

For further explanation, FIG. 5 sets forth a flow chart illustrating an additional example method for rehabilitating storage devices (414, 416, 418, 420) in a storage array (402) that includes a plurality of storage devices (414, 416, 418, 420) according to embodiments of the present disclosure. The example method depicted in FIG. 5 is similar to the example method depicted in FIG. 4, as the example method depicted in FIG. 5 also includes receiving (408) a request (404) to rehabilitate a storage device that is operating outside of a defined performance range for one or more operating parameters, selecting (410), from a hierarchy of rehabilitative actions that can be performed on the storage device, a rehabilitative action to perform on the storage device, and initiating (412) execution of the selected rehabilitative action.

The example method depicted in FIG. 5 also includes determining (502) whether the storage device is operating outside of a defined performance range for one or more operating parameters after the selected rehabilitative action has been executed. Determining (502) whether the storage device is operating outside of a defined performance range for one or more operating parameters after the selected rehabilitative action has been executed may be carried out, for example, by running one or more diagnostics suites on the storage device. Such a diagnostics suite may be selected, for example, based on which operating parameters the storage device was operating outside of the defined performance range. For example, if the storage device was operating outside of a defined performance range associated with a power consumption operating parameter, a different diagnostics suite may be selected than would be selected if the storage device was operating outside of a defined performance range associated with a write latency operating parameter.

In the example method depicted in FIG. 5, determining (502) whether the storage device is operating outside of a defined performance range for one or more operating parameters after the selected rehabilitative action has been executed can include profiling (504) I/O performance on the storage device. Profiling (504) I/O performance on the storage device may be carried out, for example, by executing one or more test suites that are used to evaluate how well a storage device is operating. Such test suites may include, for example, a series of I/O requests that can be used to measure how the average read latency of the storage device, the average write latency of the storage device, how many IOPS the storage device is performing, how many errors the storage device is generating, and so on. In such an example, the measured values may be compared to the defined performance range for one or more operating parameters to determine (502) whether the storage device is operating outside of a defined performance range for one or more operating parameters after the selected rehabilitative action has been executed. Readers will appreciate that if the storage device rehabilitation module (406) determines that the storage device is not (508) operating outside of the defined performance range for one or more operating parameters after the selected rehabilitative action has been executed, the storage device rehabilitation module (406) may proceed by waiting for another request (404) to rehabilitate a storage device.

In the example method depicted in FIG. 5, in response to affirmatively (506) determining that the storage device is operating outside of the defined performance range for one or more operating parameters after the selected rehabilitative action has been executed, the storage device rehabilitation module (406) may determine (510) whether a higher level rehabilitative action exists. Determining (510) whether a higher level rehabilitative action exists may be carried out, for example, by examining the hierarchy of rehabilitative actions to determine whether a higher level rehabilitative action exists in the hierarchy. In the example method depicted in FIG. 5, the relative term 'higher level' is used to describe a rehabilitative action that are deemed to be more disruptive to the standard operation of the storage array (402) than 'lower level' rehabilitative actions. For example, performing a secure erase of a particular storage device and rebuilding the erased data using a backup or redundancy (e.g., RAID or RAID-like) data may be deemed to be more disruptive to the standard operation of the storage array (402) than power cycling the particular storage device, and as such, performing a secure erase of a particular storage device and rebuilding the erased data using a backup or redundancy (e.g., RAID or RAID-like) data may be designated as a higher level rehabilitative action in a hierarchy than power cycling the particular storage device. Because executing a higher level rehabilitative action is deemed to be more disruptive to the standard operation of the storage array (402), it may be desirable to execute higher level rehabilitative actions only when lower level rehabilitative actions have failed to correct the behavior of a storage device that is operating outside of the defined performance range for one or more operating parameters.

In the example method depicted in FIG. 5, in response to affirmatively (512) determining that the higher level rehabilitative action exists, the storage device rehabilitation module (406) may initiate (514) execution of the higher level rehabilitative action. Readers will appreciate that in some instances a particular rehabilitative action may be performed by an entity such as a storage array controller that is executing the storage device rehabilitation module (406), while in other instances other components within the storage array (402) may be executing a rehabilitative action. For example, if the rehabilitative action is to power cycle a storage device, such a rehabilitative action may ultimately be performed by a power supply, the storage device itself, another component in the storage array (402), or any combination thereof. Initiating (514) execution of the higher level rehabilitative action may therefore be carried out, for example, by the storage device rehabilitation module (406) issuing a command to another component in the storage array (402) to perform the higher level rehabilitative action. In embodiments where the storage device rehabilitation module (406) can perform the higher level rehabilitative action, initiating (514) execution of the higher level rehabilitative action may be carried out by the storage device rehabilitation module (406) invoking the computer program instructions that carry out the higher level rehabilitative action. Readers will appreciate that in other embodiments, initiating (514) execution of the higher level rehabilitative action may be carried out by both the storage device rehabilitation module (406) and other components in the storage array (402) performing various tasks.

In the example method depicted in FIG. 5, in response to determining that the higher level rehabilitative action does not (516) exist, the storage device rehabilitation module (406) may designate (518) the storage device for replacement. Readers will appreciate that when it is determined that a higher level rehabilitative action than those rehabilitative actions that have already been executed does not (516) exist, there are no other rehabilitative actions to execute in an effort to correct the behavior of a storage device that is operating outside of the defined performance range for one or more operating parameters. Because a storage device that is operating outside of the defined performance range for one or more operating parameters can negatively impact overall system performance, it may be desirable to remove the storage device from the storage array (402).

In the example method depicted in FIG. 5, designating (518) the storage device for replacement may be carried out in a variety of ways. Designating (518) the storage device for replacement may be carried out, for example, by sending a message to a system administrator or other administrative entity indicating that the storage device should be removed from the storage array (402), by sending a message to system software in the storage array controller that causes the storage array controller to cease issuing I/O requests to the storage device, and so on. Designating (518) the storage device for replacement may be carried out, for example, by causing the storage device to be powered down such that system software executing in the storage array controller initiates data recovery processes that are triggered when a storage device in the storage array (402) fails. Readers will appreciate that although the example described in FIG. 5 describes designating (518) the storage device for replacement, in some embodiments the storage device may simply be removed from the storage array (402) without replacing the storage device.

Figure 6:
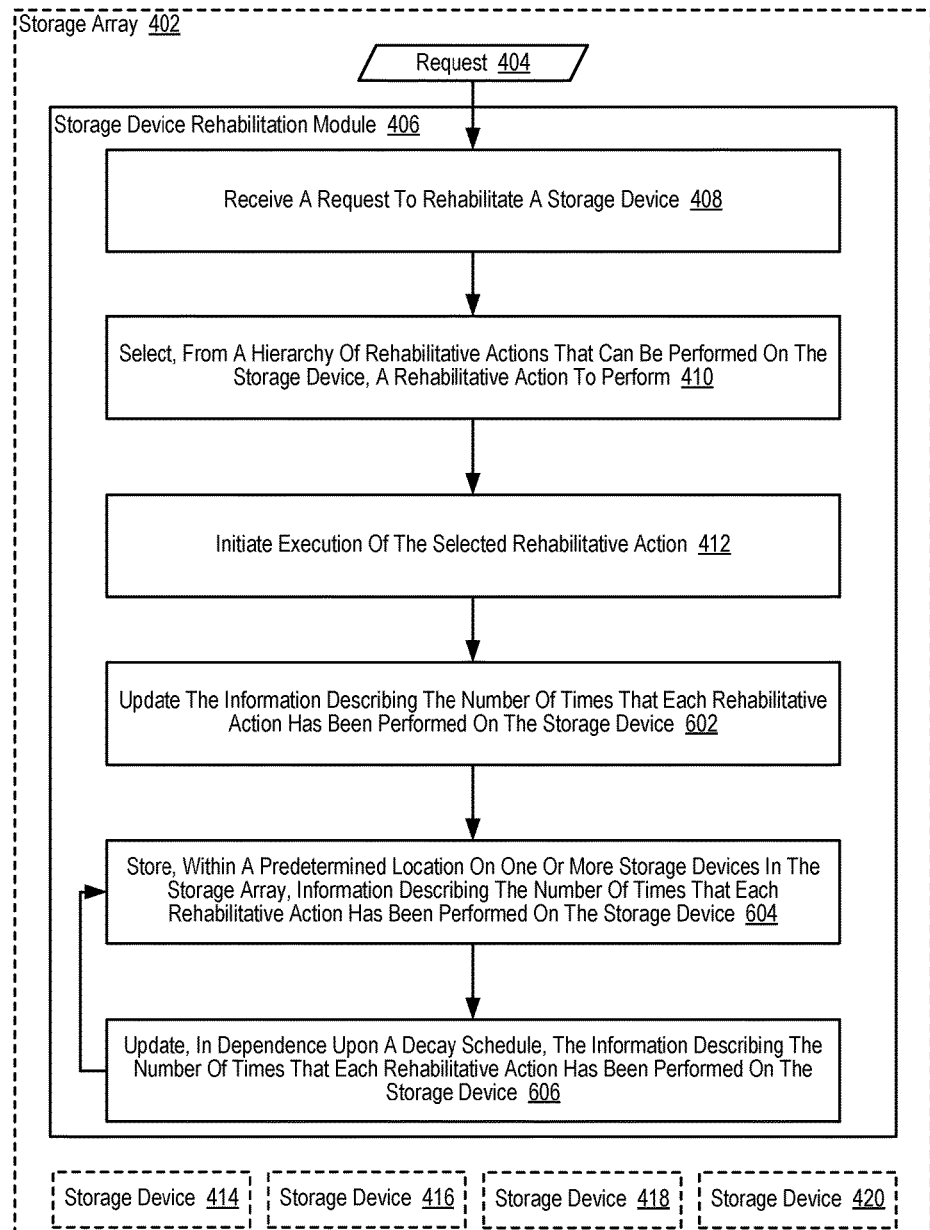
FIG. 6 sets forth a flow chart illustrating an additional example method for rehabilitating storage devices in a storage array that includes a plurality of storage devices according to embodiments of the present disclosure.

For further explanation, FIG. 6 sets forth a flow chart illustrating an additional example method for rehabilitating storage devices (414, 416, 418, 420) in a storage array (402) that includes a plurality of storage devices (414, 416, 418, 420) according to embodiments of the present disclosure. The example method depicted in FIG. 6 is similar to the example method depicted in FIG. 4, as the example method depicted in FIG. 6 also includes receiving (408) a request (404) to rehabilitate a storage device that is operating outside of a defined performance range for one or more operating parameters, selecting (410), from a hierarchy of rehabilitative actions that can be performed on the storage device, a rehabilitative action to perform on the storage device, and initiating (412) execution of the selected rehabilitative action.

The example method depicted in FIG. 6 also includes updating (602) the information describing the number of times that each rehabilitative action has been performed on the storage device. The information describing the number of times that each rehabilitative action has been performed on the storage device may be embodied, for example, as integer values that are used as counters, where each rehabilitative action is associated with a unique counter. In such an example, updating (602) the information describing the number of times that each rehabilitative action has been performed on the storage device may be carried out by incrementing the counter associated with a particular rehabilitative action each time the particular rehabilitative is executed.

The example method depicted in FIG. 6 also includes storing (604), within a predetermined location on one or more storage devices (414, 416, 418, 420) in the storage array (420), information describing the number of times that each rehabilitative action has been performed on the storage device. The predetermined location on one or more storage devices (414, 416, 418, 420) in the storage array (420) may be embodied, for example, as a predetermined address that is used store information describing the number of times that each rehabilitative action has been performed on the storage device. In an embodiment where the one or more storage devices (414, 416, 418, 420) are embodied as SSDs, each SSD may be organized as 4 KB pages, where each page has a small amount of additional memory (referred to herein as a 'header') that is attached to the page. In such an embodiment, the information describing the number of times that each rehabilitative action has been performed on the storage device may be stored (604) in such a header and may be marked with a unique identifier that may be used by a storage array controller to detect that the information stored in the header is information describing the number of times that each rehabilitative action has been performed on the storage device. Readers will appreciate that by distributing such information across one or more storage devices (414, 416, 418, 420) in the storage array (402), a storage array controller may scan the storage devices to acquire the information describing the number of times that each rehabilitative action has been performed on the storage device. Such a configuration may be especially beneficial, for example, in storage arrays where one storage array controller serves as the active controller and another storage array controller. During failover or some other transition where the active/passive roles of each controller are switched, the formerly passive storage array controller can scan the storage devices (414, 416, 418, 420) to determine the number of times that each rehabilitative action has been performed on the storage device.

The example method depicted in FIG. 6 also includes updating (606), in dependence upon a decay schedule, the information describing the number of times that each rehabilitative action has been performed on the storage device. A decay schedule may be embodied, for example, as rule that is used to reduce the number of times that each storage device is viewed as having performed one or more rehabilitative actions has been performed over time. Each rehabilitative action may be associated with its own decay schedule, which may be different for each rehabilitative action. Likewise, the decay schedule that is applied to one storage device may be different than the decay schedule that is applied to another storage device.

Consider the example described above in which a lowest level rehabilitative action includes temporarily preventing the storage device from servicing I/O operations directed to the storage array (402) and running a performance diagnostics suite on the storage device, a mid-level rehabilitative action includes power cycling the storage device, and a highest level rehabilitative action includes executing a secure erase of the storage device. In such an example, the lowest level rehabilitative action may be associated with a decay schedule such that the number of times that the lowest level rehabilitative action has been performed is decreased by one every hour, the mid-level rehabilitative action may be associated with a decay schedule such that the number of times that the mid-level rehabilitative action has been performed is decreased by one every day, and the highest level rehabilitative action may be associated with a decay schedule such that the number of times that the highest level rehabilitative action has been performed is decreased by one every week. Through the use of such decay schedules, situations where a storage device was operating poorly but has since recovered can effectively be wiped from a storage device's history over time. Readers will further appreciate that, in addition to updating (606) the information describing the number of times that each rehabilitative action has been performed on a storage device in dependence upon a decay schedule, information describing the number of times that each rehabilitative action has been performed on a particular storage device may cease to be maintained at all if the particular storage device is removed from the storage array (402).

Figure 7:
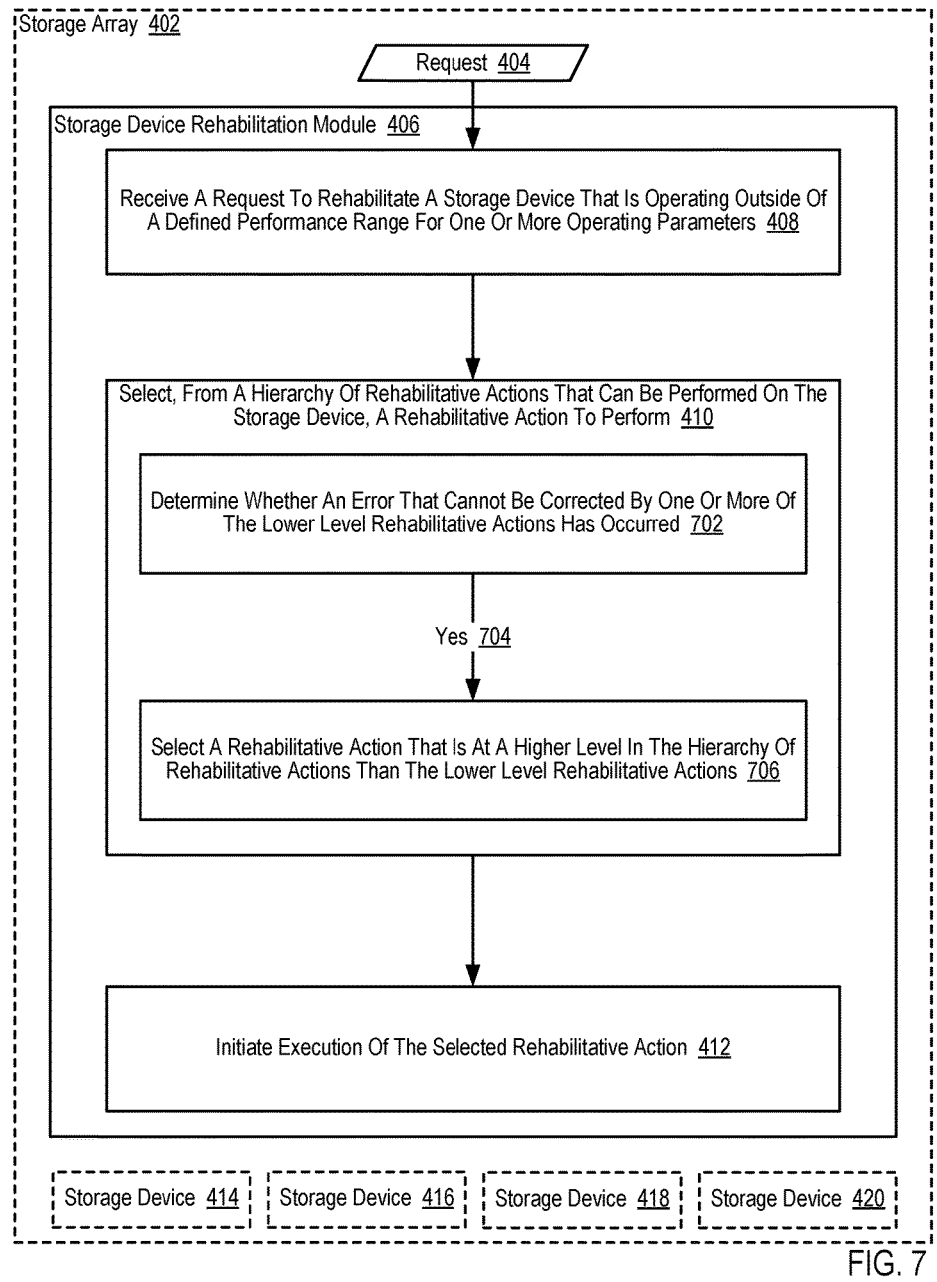
FIG. 7 sets forth a flow chart illustrating an additional example method for rehabilitating storage devices in a storage array that includes a plurality of storage devices according to embodiments of the present disclosure.

For further explanation, FIG. 7 sets forth a flow chart illustrating an additional example method for rehabilitating storage devices (414, 416, 418, 420) in a storage array (402) that includes a plurality of storage devices (414, 416, 418, 420) according to embodiments of the present disclosure. The example method depicted in FIG. 7 is similar to the example method depicted in FIG. 4, as the example method depicted in FIG. 7 also includes receiving (408) a request (404) to rehabilitate a storage device that is operating outside of a defined performance range for one or more operating parameters, selecting (410), from a hierarchy of rehabilitative actions that can be performed on the storage device, a rehabilitative action to perform on the storage device, and initiating (412) execution of the selected rehabilitative action.

In the example method depicted in FIG. 7, selecting (410) a rehabilitative action to perform on the storage device can include determining (702) whether an error that cannot be corrected by one or more of the lower level rehabilitative actions has occurred. In the example method depicted in FIG. 7, the request (404) to rehabilitate a storage device that is operating outside of a defined performance range for one or more operating parameters may include an identifier (e.g., an error code) of a particular error that has occurred. In such an example, storage device rehabilitation module (406) may maintain or otherwise have access to information that associates an identifier of a particular error with an identifier of the lowest level rehabilitative action in the hierarchy that can be used to successfully rehabilitate a storage device that is experiencing the particular error. Such information that associates an identifier of a particular error with an identifier of the lowest level rehabilitative action in the hierarchy that can be used to successfully rehabilitate a particular storage device that is experiencing the particular error may be established, for example, as a configuration parameter for the storage device rehabilitation module (406). Alternatively, information that associates an identifier of a particular error with an identifier of the lowest level rehabilitative action in the hierarchy that can be used to successfully rehabilitate a particular storage device that is experiencing the particular error may be learned over time. For example, if the storage device rehabilitation module (406) has never successfully rehabilitated a particular storage device that is experiencing a particular error by executing a particular rehabilitative action, in spite of the fact that the storage device rehabilitation module (406) has attempted to rehabilitate a particular storage device that is experiencing a particular error by executing a particular rehabilitative action more than a predetermined number of times, the storage device rehabilitation module (406) may determine that the particular rehabilitative action cannot be used to rehabilitate a particular storage device that is experiencing the particular error. In such an example, the storage device rehabilitation module (406) may determine (702) whether an error that cannot be corrected by one or more of the lower level rehabilitative actions has occurred by looking up the error identifier contained in the request (404) in the information that associates an identifier of a particular error with an identifier of the lowest level rehabilitative action in the hierarchy that can be used to successfully rehabilitate a particular storage device.

In the example method depicted in FIG. 7, selecting (410) a rehabilitative action to perform on the storage device can also include, in response to affirmatively (704) determining that an error that cannot be corrected by one or more of the lower level rehabilitative actions has occurred, selecting (706) a rehabilitative action that is at a higher level in the hierarchy of rehabilitative actions than the lower level rehabilitative actions. Consider the example described above in which a lowest level rehabilitative action includes temporarily preventing the storage device from servicing I/O operations directed to the storage array (402) and running a performance diagnostics suite on the storage device, a mid-level rehabilitative action includes power cycling the storage device, and a highest level rehabilitative action includes executing a secure erase of the storage device. In such an example, assume that the information that associates an identifier of a particular error with an identifier of the lowest level rehabilitative action in the hierarchy that can be used to successfully rehabilitate a particular storage device that is experiencing the particular error includes an entry indicating that errors with an identifier of '1' cannot be resolved by executing the lowest level rehabilitative action. In such an example, even if the lowest level rehabilitative action has not been executed the maximum number of times that is permissible, the storage device rehabilitation module (406) may affirmatively (704) determine (702) that an error that cannot be corrected by one or more of the lower level rehabilitative actions (e.g., the lowest level rehabilitative action) and the storage device rehabilitation module (406) may subsequently select (706) a rehabilitative action (e.g., the mid-level rehabilitative action of power cycling the storage device) that is at a higher level in the hierarchy of rehabilitative actions than the one or more of the lower level rehabilitative actions (e.g., the lowest level rehabilitative action) that cannot correct the error experienced by the storage device.

Figure 8:
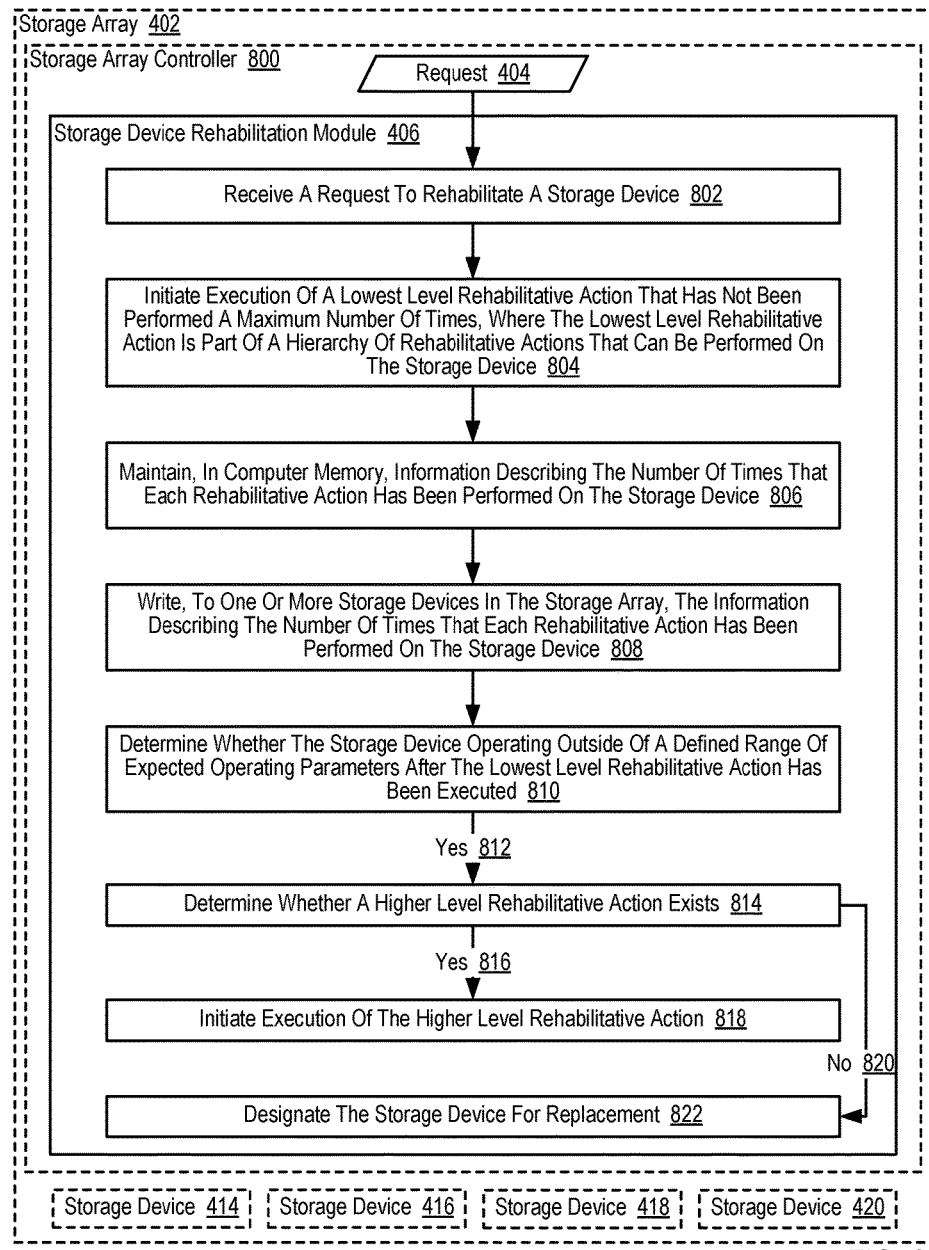
FIG. 8 sets forth a flow chart illustrating an additional example method for rehabilitating storage devices in a storage array that includes a plurality of storage devices according to embodiments of the present disclosure.

For further explanation, FIG. 8 sets forth a flow chart illustrating an additional example method for rehabilitating storage devices (414, 416, 418, 420) in a storage array (402) that includes a plurality of storage devices (414, 416, 418, 420) according to embodiments of the present disclosure. The example method depicted in FIG. 8 is depicted as being carried out by a storage device rehabilitation module (406) that is executing on a storage array controller (800) such as the storage array controllers described above with reference to FIGS. 1-3, although the method depicted in FIG. 8 could also be carried out by a storage device rehabilitation module (406) that is executing on computer hardware that is contained in one or more blades that are part of a storage system that includes a plurality of blades or any other form of a storage system.

The example method depicted in FIG. 8 includes receiving (802) a request to rehabilitate a storage device. Receiving (802) a request to rehabilitate a storage device may be carried out, for example, by the storage device rehabilitation module (406) receiving a message from one or more other modules in the storage array (402) that tracks the performance of the storage devices (414, 416, 418, 420) in the storage array (402). The request (404) that is received by the storage device rehabilitation module (406) may include information such as an identifier of the particular storage device that is to be rehabilitated, information identifying any particular operating parameters for which the storage device is operating outside of the defined performance range, information identifying a particular error encountered by the storage device, and so on.

The example method depicted in FIG. 8 also includes initiating (804) execution of a lowest level rehabilitative action that has not been performed a maximum number of times, where the lowest level rehabilitative action is part of a hierarchy of rehabilitative actions that can be performed on the storage device. Readers will appreciate that in some instances a particular rehabilitative action may be performed by an entity such as a storage array controller that is executing the storage device rehabilitation module (406), while in other instances other components within the storage array (402) may be executing a rehabilitative action. For example, if the rehabilitative action is to power cycle a storage device, such a rehabilitative action may ultimately be performed by a power supply, the storage device itself, another component in the storage array (402), or any combination thereof. Initiating (804) execution of the lowest level rehabilitative action that has not been performed a maximum number of times may therefore be carried out, for example, by the storage device rehabilitation module (406) issuing a command to another component in the storage array (402) to perform the selected rehabilitative action. In embodiments where the storage device rehabilitation module (406) can perform the selected rehabilitative action, initiating (804) execution of the lowest level rehabilitative action that has not been performed a maximum number of times may be carried out by the storage device rehabilitation module (406) invoking the computer program instructions that carry out the selected rehabilitative action. Readers will appreciate that in other embodiments, initiating (804) execution of the lowest level rehabilitative action that has not been performed a maximum number of times may be carried out by both the storage device rehabilitation module (406) and other components in the storage array (402) performing various tasks.

The example method depicted in FIG. 8 also includes maintaining (806), in computer memory, information describing the number of times that each rehabilitative action has been performed on the storage device. The computer memory may be embodied, for example, as RAM that is include in a storage array controller as described above. The information describing the number of times that each rehabilitative action has been performed on the storage device may be maintained (806) in computer memory, for example, by updating such information each time a particular rehabilitative action is invoked and updating such information according to a decay schedule, as described in greater detail above.

The example method depicted in FIG. 8 also includes writing (808), to one or more storage devices in the storage array, the information describing the number of times that each rehabilitative action has been performed on the storage device. The information describing the number of times that each rehabilitative action has been performed on the storage device may be written (808), for example, to a predetermined location within one or more of the storage devices (414, 416, 418, 420) in the storage array (420). The predetermined location on one or more storage devices (414, 416, 418, 420) in the storage array (420) may be embodied, for example, as a predetermined address that is used store information describing the number of times that each rehabilitative action has been performed on the storage device. In an embodiment where the one or more storage devices (414, 416, 418, 420) are embodied as SSDs, each SSD may be organized as 4 KB pages, where each page has a small amount of additional memory (referred to herein as a 'header') that is attached to the page. In such an embodiment, the information describing the number of times that each rehabilitative action has been performed on the storage device may be written (808) to such a header and may be marked with a unique identifier that may be used by a storage array controller to detect that the information stored in the header is information describing the number of times that each rehabilitative action has been performed on the storage device. Readers will appreciate that by distributing such information across one or more storage devices (414, 416, 418, 420) in the storage array (402), a storage array controller may scan the storage devices to acquire the information describing the number of times that each rehabilitative action has been performed on the storage device. Such a configuration may be especially beneficial, for example, in storage arrays where one storage array controller serves as the active controller and another storage array controller. During failover or some other transition where the active/passive roles of each controller are switched, the formerly passive storage array controller can scan the storage devices (414, 416, 418, 420) to determine the number of times that each rehabilitative action has been performed on the storage device.

The example method depicted in FIG. 8 also includes determining (810) whether the storage device operating outside of a defined range of expected operating parameters after the lowest level rehabilitative action has been executed. Determining (810) whether the storage device is operating outside of a defined performance range for one or more operating parameters after the selected rehabilitative action has been executed may be carried out, for example, by running one or more diagnostics suites on the storage device. Such a diagnostics suite may be selected, for example, based on which operating parameters the storage device was operating outside of the defined performance range. For example, if the storage device was operating outside of a defined performance range associated with a power consumption operating parameter, a different diagnostics suite may be selected than would be selected if the storage device was operating outside of a defined performance range associated with a write latency operating parameter.

In the example method depicted in FIG. 8, in response affirmatively (812) determining that the storage device is operating outside of the defined range of expected operating parameters after the lowest level rehabilitative action has been executed, the storage device rehabilitation module (406) may determine (814) whether a higher level rehabilitative action exists. Determining (814) whether a higher level rehabilitative action exists may be carried out, for example, by examining the hierarchy of rehabilitative actions to determine whether a higher level rehabilitative action exists in the hierarchy. In the example method depicted in FIG. 8, the relative term 'higher level' is used to describe a rehabilitative action that are deemed to be more disruptive to the standard operation of the storage array (402) than 'lower level' rehabilitative actions. For example, performing a secure erase of a particular storage device and rebuilding the erased data using a backup or redundancy (e.g., RAID or RAID-like) data may be deemed to be more disruptive to the standard operation of the storage array (402) than power cycling the particular storage device, and as such, performing a secure erase of a particular storage device and rebuilding the erased data using a backup or redundancy (e.g., RAID or RAID-like) data may be designated as a higher level rehabilitative action in a hierarchy than power cycling the particular storage device. Because executing a higher level rehabilitative action is deemed to be more disruptive to the standard operation of the storage array (402), it may be desirable to execute higher level rehabilitative actions only when lower level rehabilitative actions have failed to correct the behavior of a storage device that is operating outside of the defined performance range for one or more operating parameters.

In the example method depicted in FIG. 8, in response to affirmatively (816) determining that the higher level rehabilitative action exists, the storage device rehabilitation module (406) may initiate (818) execution of the higher level rehabilitative action. Readers will appreciate that in some instances a particular rehabilitative action may be performed by an entity such as a storage array controller that is executing the storage device rehabilitation module (406), while in other instances other components within the storage array (402) may be executing a rehabilitative action. For example, if the rehabilitative action is to power cycle a storage device, such a rehabilitative action may ultimately be performed by a power supply, the storage device itself, another component in the storage array (402), or any combination thereof. Initiating (818) execution of the higher level rehabilitative action may therefore be carried out, for example, by the storage device rehabilitation module (406) issuing a command to another component in the storage array (402) to perform the higher level rehabilitative action. In embodiments where the storage device rehabilitation module (406) can perform the higher level rehabilitative action, initiating (818) execution of the higher level rehabilitative action may be carried out by the storage device rehabilitation module (406) invoking the computer program instructions that carry out the higher level rehabilitative action. Readers will appreciate that in other embodiments, initiating (818) execution of the higher level rehabilitative action may be carried out by both the storage device rehabilitation module (406) and other components in the storage array (402) performing various tasks.

In the example method depicted in FIG. 8, in response to determining that the higher level rehabilitative action does not (820) exists, the storage device rehabilitation module (406) may designate (822) the storage device for replacement. Readers will appreciate that when it is determined that a higher level rehabilitative action than those rehabilitative actions that have already been executed does not (820) exist, there are no other rehabilitative actions to execute in an effort to correct the behavior of a storage device that is operating outside of the defined performance range for one or more operating parameters. Because a storage device that is operating outside of the defined performance range for one or more operating parameters can negatively impact overall system performance, it may be desirable to remove the storage device from the storage array (402).

In the example method depicted in FIG. 8, designating (822) the storage device for replacement may be carried out in a variety of ways. Designating (822) the storage device for replacement may be carried out, for example, by sending a message to a system administrator or other administrative entity indicating that the storage device should be removed from the storage array (402), by sending a message to system software in the storage array controller that causes the storage array controller to cease issuing I/O requests to the storage device, and so on. Designating (822) the storage device for replacement may be carried out, for example, by causing the storage device to be powered down such that system software executing in the storage array controller initiates data recovery processes that are triggered when a storage device in the storage array (402) fails. Readers will appreciate that although the example described in FIG. 8 describes designating (822) the storage device for replacement, in some embodiments the storage device may simply be removed from the storage array (402) without replacing the storage device.

Although the examples described above relate to embodiments where a request to rehabilitate a storage device is received, a rehabilitative action to perform is selected, and execution of the rehabilitative action is initiated, in other embodiment, such steps may be performed for any component in a storage array. For example, a request to rehabilitate a connectivity module that couples one or more storage devices to one or more storage array controllers may be received, a rehabilitative action to perform on the connectivity module may be selected from a hierarchy of rehabilitative actions that can be performed on the connectivity module, and execution of the selected rehabilitative action may be initiated. Such a connectivity module may include data communications links, data communications interfaces, networking components, and so on.

Figure 9:
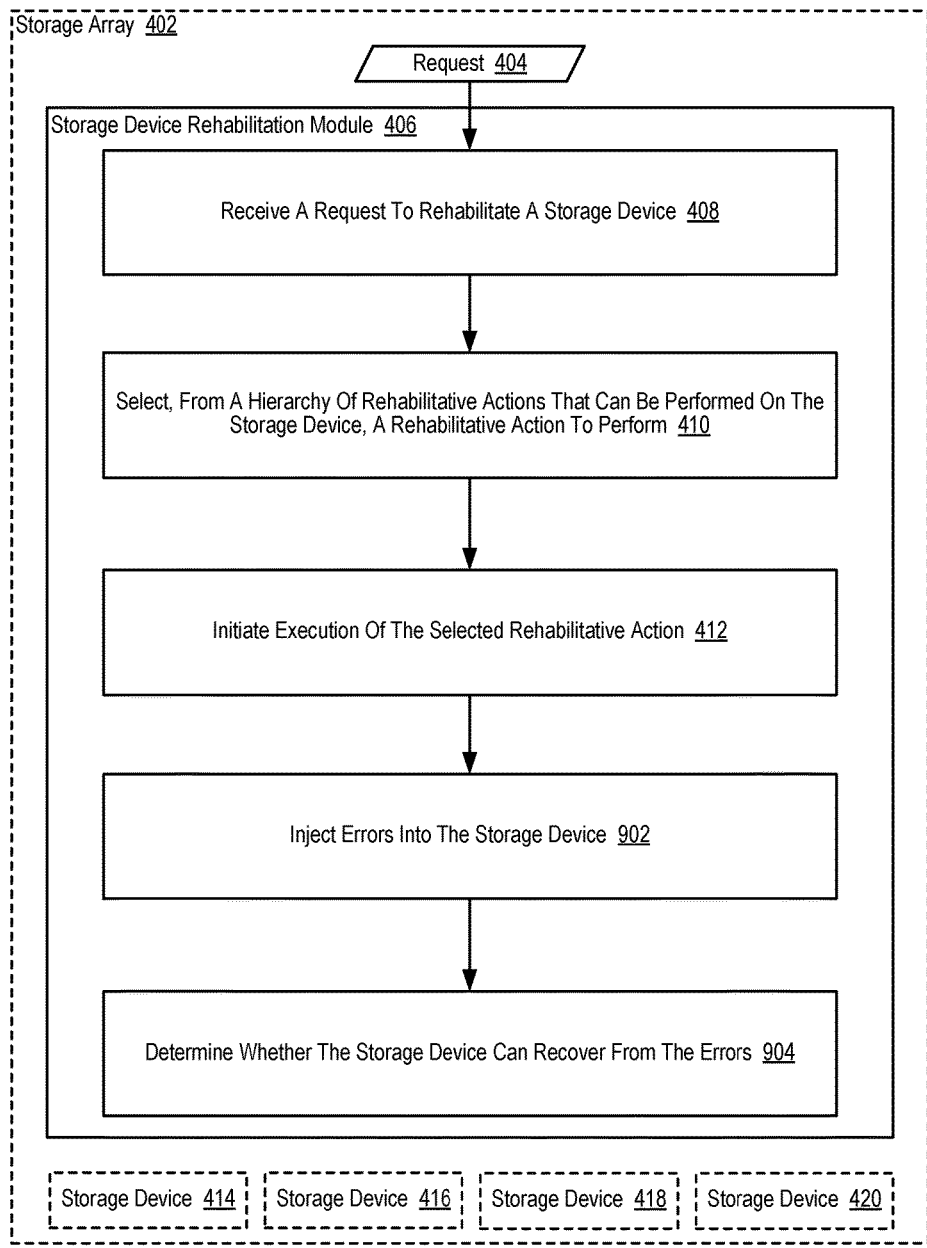
FIG. 9 sets forth a flow chart illustrating an additional example method for rehabilitating storage devices in a storage array that includes a plurality of storage devices according to embodiments of the present disclosure.

For further explanation, FIG. 9 sets forth a flow chart illustrating an additional example method for rehabilitating storage devices (414, 416, 418, 420) in a storage array (402) that includes a plurality of storage devices (414, 416, 418, 420) according to embodiments of the present disclosure. The example method depicted in FIG. 9 is similar to the example method depicted in FIG. 4, as the example method depicted in FIG. 9 also includes receiving (408) a request (404) to rehabilitate a storage device that is operating outside of a defined performance range for one or more operating parameters, selecting (410), from a hierarchy of rehabilitative actions that can be performed on the storage device, a rehabilitative action to perform on the storage device, and initiating (412) execution of the selected rehabilitative action.

The example method depicted in FIG. 9 also includes injecting (902) errors into the storage device. Readers will appreciate that storage devices may exhibit a variety of error states. For example, an I/O operation directed to the storage device may take longer than expected and complete successfully, an I/O operation directed to the storage device may take longer than expected and complete unsuccessfully, an I/O operation directed to the storage device may take longer than expected and completion may be preempted by a timeout, and so on. In such an example, in an effort to verify that software and hardware within the storage array (402) can recover from such inevitable errors, errors may be injected (902) into the storage device to test whether the storage array (402) can recover from such errors. In the example method depicted in FIG. 9, injecting (902) errors into the storage device may be carried out through the use of commands that are issued by a host system such as a storage array controller, where such commands are supported by the storage device to replicate the occurrence of particular errors. Such commands may include, for example, an identifier of the error condition that is to be replicated, an identification of the storage device that is to replicate the occurrence of the identified error, and so on. Such commands may also include fields that enable the host system to specify when the error condition is to be replicated. For example, the host system may specify that the error condition is to be replicated at a particular date and time, the host system may specify that the error condition is to be replicated a certain amount of time after the command was issued, and so on. In such a way, the injection of errors may be delayed to a known point in time where the storage array (402) is not heavily utilized or otherwise delayed to a known point in time that is chosen based on various considerations.

The example method depicted in FIG. 9 also includes determining (904) whether the storage device can recover from the errors. Readers will appreciate that recovering from such errors may require, for example, initiating the execution of various rehabilitative actions. Once the rehabilitative actions have been performed, a series of tests may be executed on the storage device to determine whether the storage device is operating as expected. In such a way, determining (904) whether the storage device can recover from the errors may be carried out by verifying that, in spite of the fact that errors were injected (902) into the storage device, the storage device is operating within a defined performance range for one or more operating parameters after taking actions to correct the injected (902) errors.

Readers will appreciate that although the preceding paragraphs relate to the injection of specific errors, it may also be desirable to profile how storage devices perform at various points in their life cycles, so that the storage array (402) can best respond to the performance of a storage device as the device ages. Consider an example in which the storage device is an SSD. SSDs include NAND flash that must undergo program-erase ('P/E') cycles as part of writing data to and erasing data from the SSD. In such an example, the lifespan of an SSD may be characterized in terms of how many P/E cycles are expected to be supported by the NAND flash in the SSD. For example, if the NAND flash within the SSD is expected to perform 100,000 P/E cycles, the lifespan of the NAND flash could be characterized as being 100,000 P/E cycles. Readers will appreciate that as an SSD ages (i.e., as more P/E cycles are performed on the NAND flash in the SSD) and the NAND flash within the SSD degrades, the response time and latency exhibited by the SSD may increase as firmware within the SSD must incur additional overhead to service an I/O request, such as performing error recovery tasks due to high bit-error rates in the underlying NAND flash when performing a read operation. In order to ensure that the storage array (402) is properly handling situations in which response times and latencies exhibited by the SSD increase due to the SSD aging, the storage array (402) may profile the performance of a storage device during the lifecycle of the storage device.

Figure 10:
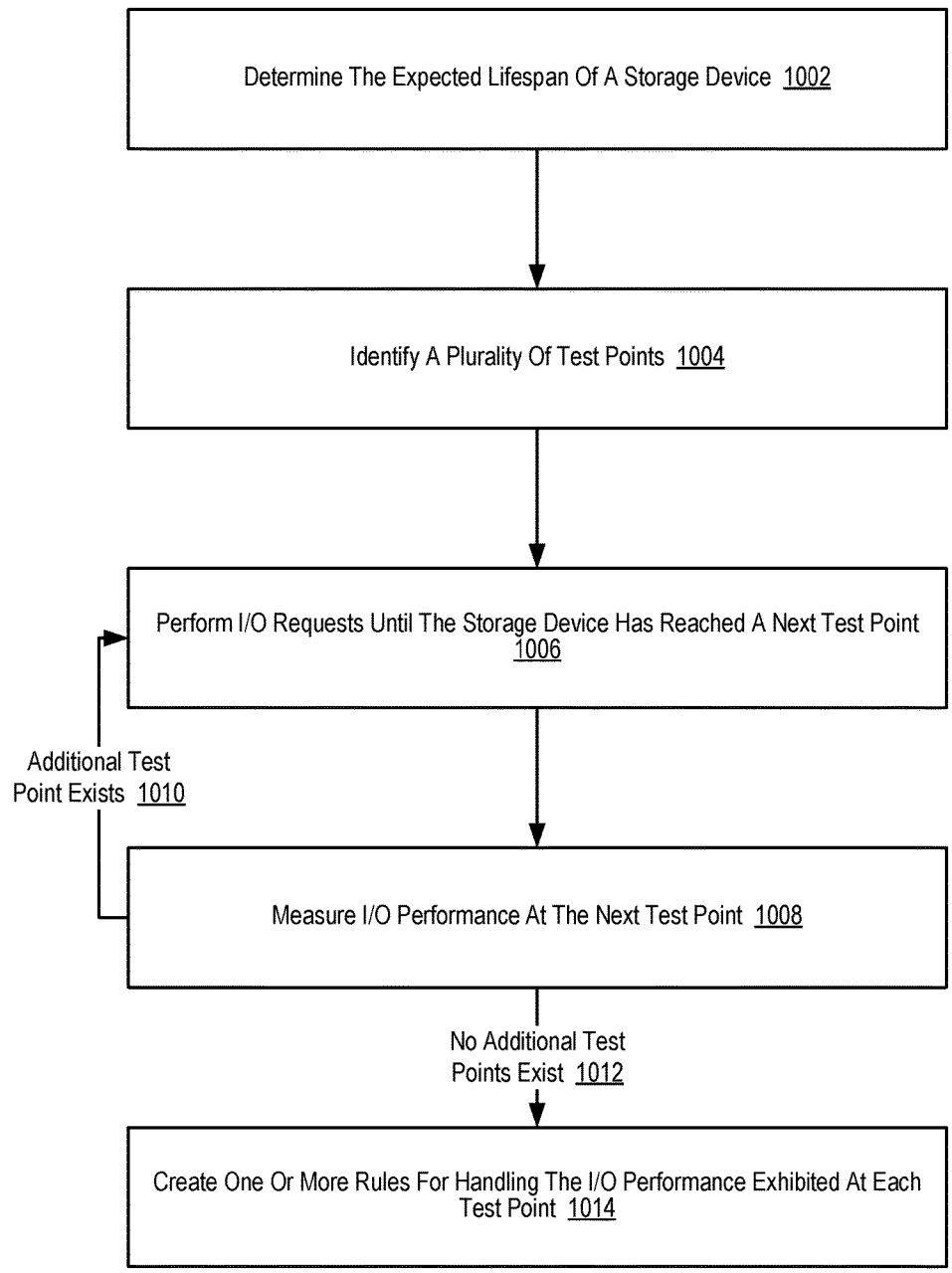
FIG. 10 sets forth a flow chart illustrating an additional example method for rehabilitating storage devices in a storage array that includes a plurality of storage devices according to embodiments of the present disclosure.

For further explanation, FIG. 10 illustrates an example method of profiling performance of a storage device during the lifecycle of the storage device according to embodiments of the present disclosure. Although not expressly illustrated in FIG. 10, readers will appreciate that profiling performance of a storage device during the lifecycle of the storage device may be carried out in storage systems configured for rehabilitating storage devices according to embodiments of the present disclosure. The example method depicted in FIG. 10 includes determining (1002) the expected lifespan of a storage device. As described above, the expected lifespan of a storage device may be embodied, for example, as the number of P/E cycles that NAND flash within the SSD is expected to be able to perform. The expected lifespan of a storage device may be determined (1002), for example, based on information provided by the manufacturer of the storage device, based on information collected through testing of the storage device, and so on.

The example method depicted in FIG. 10 also includes identifying (1004) a plurality of test points for the storage device. A test point for the storage device may be specified, for example, as a percentage of the expected lifespan of the storage device. For example, the test points may indicate that the storage device should be tested at 0% of its expected lifespan, at 25% of its expected lifespan, at 50% of its expected lifespan, at 75% of its expected lifespan, and at 100% of its expected lifespan. Using the example described above where the NAND flash within the SSD is expected to be able to perform 100,000 P/E cycles, the test points described in the preceding sentence would indicate that the storage device should be tested when NAND flash within the SSD has performed 0 P/E cycles, the storage device should be tested when NAND flash within the SSD has performed 25,000 P/E cycles, the storage device should be tested when NAND flash within the SSD has performed 50,000 P/E cycles, the storage device should be tested when NAND flash within the SSD has performed 75,000 P/E cycles, and the storage device should be tested when NAND flash within the SSD has performed 100,000 P/E cycles.

Readers will appreciate that the test points may include additional parameters beyond the number of P/E cycles performed by NAND flash in the SSD. For example, the test points may also include a parameter that specifies the SSDs should, while powered down, be exposed to a predetermined ambient temperature for a predetermined amount of time as part of reaching a particular test point. In such an example, multiple test points may exist at the same (or roughly the same, within a predetermined threshold) wear level. For example, at each of the test points described above, it may be desirable to: 1) test the storage devices after the storage devices has been exposed to a predetermined ambient temperature for a predetermined amount of time that is equivalent to the storage device residing within an environment for one month where the ambient temperature is 40 degrees Celsius, and 2) test the storage devices after the storage devices has been exposed to a predetermined ambient temperature for a predetermined amount of time that is equivalent to the storage device residing within an environment for three months where the ambient temperature is 40 degrees Celsius. Readers will appreciate that such test points may be designed to emulate the expected conditions of a storage array that could include such storage devices, and that the test points may include any number of additional parameters beyond the number of P/E cycles performed by NAND flash in the SSD.

The example method depicted in FIG. 10 also includes performing (1006) I/O requests until the storage device has reached a next test point. Performing (1006) I/O requests until the storage device has reached a next test point may be carried out, for example, by subjecting the storage device to a bandwidth limited sequential write workload that increases the amount of P/E cycles performed by the NAND flash in the SSDs to a level as specified in a next test point. Consider the example described above where the storage device should be tested when NAND flash within the SSD has performed 25,000 P/E cycles and the storage device should be tested when NAND flash within the SSD has performed 50,000 P/E cycles. In such an example, once testing has been completed when the SSD has performed 25,000 P/E cycles, the storage device may be subjected to a bandwidth limited sequential write workload that increases the amount of P/E cycles performed by the NAND flash in the SSDs from 25,000 to 50,000.

The example method depicted in FIG. 10 also includes measuring (1008) I/O performance at the next test point. In the example method depicted in FIG. 10, once the storage device has reached a next test point, I/O performance may be measured (1008) by performing a series of I/O operations on the storage device. Such a series of I/O operations may include, for example, performing one or more sub-series of random read requests at a particular transfer size and queue depth for a predetermined period of time, performing one or more sub-series of sequential read requests at a particular transfer size and queue depth for a predetermined period of time, or any combination thereof. In fact, such a series of I/O operations may include many variations on the transfer sizes and queue depths that are used in each sub-series, different sub-series may be ordered in a variety of ways, and so on. In the example method depicted in FIG. 10, various aspects of I/O performance at the next test point may be measured (1008). For example, the average latency may be measured, the latency of the slowest 1% of I/O operations may be measured, the latency of the slowest 0.1% of I/O operations may be measured, the latency of the slowest 0.01% of I/O operations may be measured, and so on. Readers will appreciate that the latency of the slowest I/O operations may be measured to collect worst-case performance metrics, as such worst cases often require the highest degree of intervention from other components in the storage array. For example, it may be much faster to service a worst-case read request that is directed to a particular storage device by rebuilding the data stored on the particular storage device using RAID or RAID-like data stored on other storage devices in the storage array, rather than allowing the particular storage device to execute a worst-case read operation.

Readers will appreciate that once the I/O performance of the storage device at a particular test point has been measured (1008), profiling I/O performance as a storage device ages may proceed by determining whether additional test points exist. If an additional test point exists (1010), profiling I/O performance of a storage device as the storage device ages may proceed by performing (1006) I/O requests until the storage device has reached a next test point. If no additional test points exist (1012), profiling I/O performance of a storage device as the storage device ages may proceed by creating (1014) one or more rules for handling the I/O performance exhibited at each test point, as described in more detail below.

The example method depicted in FIG. 10 also includes creating (1014) one or more rules for handling the I/O performance exhibited at each test point. Creating (1014) one or more rules for handling the I/O performance exhibited at each test point. The one or more rules for handling the I/O performance exhibited at each test point may include, for example, a rule specifying that when a storage device is at 25% of its expected lifecycle, a read request should be serviced through rebuilding the data targeted by the read request using RAID or RAID-like data stored on other storage devices in the storage array when the latency of a pending read request hits a time threshold that matches the slowest 0.0001% of read requests identified during testing of the storage device at 25% of its expected lifecycle. Likewise, the one or more rules for handling the I/O performance exhibited at each test point may include a rule specifying that when a storage device is at 75% of its expected lifecycle, a read request should be serviced through rebuilding the data targeted by the read request using RAID or RAID-like data stored on other storage devices in the storage array when the latency of a pending read request hits a time threshold that matches the slowest 1% of read requests identified during testing of the storage device at 75% of its expected lifecycle. Readers will appreciate that the one or more rules for handling the I/O performance exhibited at each test point may be created (1014) so as to avoid certain situations such as an I/O operation pending for more than a predetermined period of time, and such rules may be used to determine when other components within the storage array should intervene with the servicing of an I/O operation. As such, creating (1014) one or more rules for handling the I/O performance exhibited at each test point may be carried out by evaluating various performance objectives and creating rules that enable a storage system to meet such performance objectives.

Readers will appreciate that while the embodiments described above relate to embodiments where the storage device can be embodied as an SSD that includes NAND flash, the techniques described above can be applied and modified to apply to other technologies. Likewise, profiling the performance of a storage device over its lifecycle and developing rules that enable a storage system to better handle the performance of a storage device over its lifecycle may include additional or fewer steps, which are performed in different order than described above.

Readers will appreciate that although the example methods described above are depicted in a way where a series of steps occurs in a particular order, no particular ordering of the steps is required unless explicitly stated. Example embodiments of the present invention are described largely in the context of a fully functional computer system for rehabilitating storage devices in a storage array that includes a plurality of storage devices. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of rehabilitating storage devices in a storage array that includes a plurality of storage devices, the method comprising:
   receiving a request to rehabilitate a storage device that is operating outside of a defined performance range for one or more operating parameters;
   selecting, from a hierarchy of rehabilitative actions that can be performed on the storage device, a rehabilitative action to perform on the storage device in dependence upon information describing a number of times that one or more of the rehabilitative actions previously have been performed on the storage device; and
   initiating execution of the selected rehabilitative action.

2. The method of claim 1 further comprising determining whether the storage device is operating outside of the defined range of expected operating parameters after the selected rehabilitative action has been executed.

3. The method of claim 2 further comprising:
   responsive to determining that the storage device is operating outside of the defined range of expected operating parameters after the selected rehabilitative action has been executed, determining whether a higher level rehabilitative action exists;
   responsive to determining that the higher level rehabilitative action exists, initiating execution of the higher level rehabilitative action; and
   responsive to determining that the higher level rehabilitative action does not exist, designating the storage device for replacement.

4. The method of claim 2 wherein determining whether the storage device is operating outside of the defined range of expected operating parameters after the selected rehabilitative action has been executed further comprises profiling input/output ('I/O') performance on the storage device.

5. The method of claim 1 further comprising:
   injecting errors into the storage device; and
   determining whether the storage device can recover from the errors.

6. The method of claim 1 further comprising updating the information describing the number of times that each rehabilitative action has been performed on the storage device.

7. The method of claim 1 further comprising updating, in dependence upon a decay schedule, the information describing the number of times that each rehabilitative action has been performed on the storage device.

8. The method of claim 1 further comprising storing, within a predetermined location on one or more storage devices in the storage array, information describing the number of times that each rehabilitative action has been performed on the storage device.

9. The method of claim 1 wherein selecting the rehabilitative action to perform further comprises:
   determining whether an error that cannot be corrected by one or more of the lower level rehabilitative actions has occurred; and
   responsive to determining that an error that cannot be corrected by one or more of the lower level rehabilitative actions has occurred, selecting a rehabilitative action that is at a higher level in the hierarchy of rehabilitative actions than the lower level rehabilitative actions.

10. An apparatus that includes a computer memory and a computer processor, the computer memory including computer program instructions that, when executed by the computer processor, cause the apparatus to carry out the steps of:
   receiving a request to rehabilitate a storage device; and
   initiating execution of a lowest level rehabilitative action that has not been performed previously a maximum number of times, wherein the lowest level rehabilitative action is part of a hierarchy of rehabilitative actions that can be performed on the storage device.

11. The apparatus of claim 10 further comprising computer program instructions that, when executed by the computer processor, cause the apparatus to carry out the step of maintaining, in the computer memory, information describing the number of times that each rehabilitative action has been performed on the storage device.

12. The apparatus of claim 11 further comprising computer program instructions that, when executed by the computer processor, cause the apparatus to carry out the step of writing, to one or more storage devices in the storage array, the information describing the number of times that each rehabilitative action has been performed on the storage device.

13. The apparatus of claim 11 further comprising computer program instructions that, when executed by the computer processor, cause the apparatus to carry out the step of updating the information describing the number of times that each rehabilitative action has been performed on the storage device.

14. The apparatus of claim 11 further comprising computer program instructions that, when executed by the computer processor, cause the apparatus to carry out the step of updating, in dependence upon a decay schedule, the information describing the number of times that each rehabilitative action has been performed on the storage device.

15. The apparatus of claim 10 further comprising computer program instructions that, when executed by the computer processor, cause the apparatus to carry out the step of determining whether the storage device operating outside of a defined range of expected operating parameters after the lowest level rehabilitative action has been executed.

16. The apparatus of claim 15 further comprising computer program instructions that, when executed by the computer processor, cause the apparatus to carry out the steps of:
   responsive to determining that the storage device is operating outside of the defined range of expected operating parameters after the lowest level rehabilitative action has been executed, determining whether a higher level rehabilitative action exists;
   responsive to determining that the higher level rehabilitative action exists, initiating execution of the higher level rehabilitative action; and
   responsive to determining that the higher level rehabilitative action does not exist, designating the storage device for replacement.

17. The apparatus of claim 15 wherein determining whether the storage device is operating as expected after the lowest level rehabilitative action has been executed further comprises profiling input/output ('I/O') performance on the storage device.

18. A method of rehabilitating components within a storage array, the method comprising:
   receiving a request to rehabilitate a component in the storage array;
   selecting, from a hierarchy of rehabilitative actions that can be performed on the component, a rehabilitative action to perform in dependence upon a number of times that each rehabilitative action previously has been performed on the component; and
   initiating execution of the selected rehabilitative action.

19. The method of claim 18 wherein the component is a storage device.

20. The method of claim 18 wherein the component is a connectivity module that couples one or more storage devices to one or more storage array controllers.

* * * * *